United States Patent [19]
Van De Vanter

[11] Patent Number: 5,813,019
[45] Date of Patent: Sep. 22, 1998

[54] TOKEN-BASED COMPUTER PROGRAM EDITOR WITH PROGRAM COMMENT MANAGEMENT

[75] Inventor: Michael L. Van De Vanter, Mountain View, Calif.

[73] Assignee: Sun Microsystems, Inc., Mountain View, Calif.

[21] Appl. No.: 499,088

[22] Filed: Jul. 6, 1995

[51] Int. Cl.⁶ .................................................. G06F 17/21
[52] U.S. Cl. ........................ 707/512; 707/531; 707/527; 395/701
[58] Field of Search .................................. 395/773, 776, 395/788–793, 781, 789, 701–703

[56] References Cited

U.S. PATENT DOCUMENTS

| | | | |
|---|---|---|---|
| 4,989,145 | 1/1991 | Kyushima | 395/759 |
| 5,493,678 | 2/1996 | Arcuri et al. | 395/601 |
| 5,513,305 | 4/1996 | Maghbouleh | 395/761 |

OTHER PUBLICATIONS

Kitchovitch, "Parsing Method Supporting the Process of Program Editing with On–line Syntax Checking", *Problems of Engineering, Cybernetics, and Robotics*, v. 40, pp. 49–59, Jan. 1993.

Brun et al., "The Token–Oriented Approach to Program Editing", *Sigplan Notices*, v. 20, n. 2, pp. 17–20, Feb. 1985.

Shilling, "Incremental LL(1) parsing in language–based editors", IEEE Transactions on Software Engineering, v. 19, n. 9, pp. 935–940, Sep. 1992.

Lunney et al., "Syntax–directed editing", Software Engineering Journal, v. 3, n. 2, pp. 37–46, Mar. 1988.

Madhavji et al., "Semi–structured cursor movements in MUPE–2", Software Engineering Journal, v. 4, n. 6, pp. 309–317, Nov. 1989.

Zelkowitz et al., "Experiences building a syntax–directed editor", Software Engineering Journal, v. 4, n. 6, pp. 294–300, Nov. 1989.

Video: Siggraph Video Review: Magpie—Tektronix. (Item #9), Issue 9, CHI'95, Jun. 1985.

Oman, et al., Typographic Style Is More Than Cosmetic Communications of the ACM, May 1990, vol. 33, No. 5, pp. 506–520.

Reps, et al., The Synthesizer Generator Reference Manual Dept. of Computer Science, Cornell University, Section 3, pp. 79–106, Jul. 1987.

(List continued on next page.)

*Primary Examiner*—Joseph R. Burwell
*Attorney, Agent, or Firm*—Douglas J. Crisman; Flehr Hohbach Test Albritton & Herbert LLP

[57] ABSTRACT

A user-friendly text editor for structurally represented computer programs is disclosed. The present editor combines advantages of text editors and structure editors by transforming, as the user types, the text stream entered by the user into a token stream, where the tokens of the token stream constitute the words of the program being entered. Each of the tokens is classified by the editor as one of a group of extended lexemes defined by the language in which the program being edited is written. These extended lexemes are defined similar to lexemes that might be used in a batch lexer, but are more numerous as the present editor must account for the incomplete and ill-formed lexemes that arise as the user types the program. Before performing lexical analysis, the present editor separates program statements from program comments. The editor then stores the text of the comments along with comment positioning information that allows the original position of the comments as entered by the user to be recreated for printing or display purposes. Based on the token stream and the separately represented comments, the editor prettyprints the program and comments as the user types. The editor also allows the user to edit the program from the prettyprinted display as if the program were internally represented as text. The present editor also allows the user to periodically request a syntactical analysis of the program, wherein the structure of the program is represented in a syntax tree that references the token stream.

29 Claims, 5 Drawing Sheets

OTHER PUBLICATIONS

Van de Vanter, User Interaction in language–based editing systems Chapter 4 and Chapter 5, pp. 35–111 & List of Reference, Dec. 1992.

Ballance, et al., Grammatical Abstraction and Incremental Syntax Analysis pp. 185–198, Sigplan '88, Jun. 1988.

Calliss, Problems with Automatic Restructurers (Nov. 1987) University of Durham, Durham, England, pp. 13–21, Nov. 1987.

Ballance et al., The Pan Language–based Editing System ACM Transactions on Software Engineering & Methodology, vol. 1, pp. 95–127, Jan. 1992.

Schwartz, et al., Incremental Compilation in Magpie Sigplan Notice, vol. 19, No. 6, pp. 122–131, Jun. 1984.

Teitelbaum, et al., The Cornell Program Synthesizer: A Syntax–Directed Programming Environment Comm. of the ACM, v. 24, n. 9. pp. 563–573, Sep. 1981.

Baecker, et al., Human Factors and Typography for More Readable Programs Chapter 6, pp. 259–279 + List of References & Bibliography, Jan. 1987.

TOKEN-BASED COMPUTER PROGRAM EDITOR WITH PROGRAM COMMENT MANAGEMENT

The present invention relates generally to computer program editors, and particularly to a computer program editor in which program statement are internally represented as a stream of tokens and associated comments are stored separately from the token stream.

BACKGROUND OF THE INVENTION

Computer program editors are specialized editors that allow computer program authors, or programmers, to create and modify computer programs. In addition to supporting basic word processing functions such as block copy/move and string find/replace, most computer program editors provide additional editing features that are especially valuable to the programmer. Such additional features include highlighting important structural constructs (e.g., condition statements, keywords, brackets, etc.) and providing language-sensitive commands for navigating, modifying and reformatting or "prettyprinting" programs. While all existing program editors try to provide similar functions, they fall into one of two classes based on how they internally represent the program being edited: as streams of text (text-oriented editors) or as syntax trees (structure-oriented editors).

The most common design approach for program editors is to begin with a text editor and add the aforementioned useful features based on linguistic (or structural) knowledge of the program being entered. This type of editor internally represents the program being edited as a "flat", text file, in which the editable characters predominantly have a one-to-one correspondence to keystrokes made by the program author. In such a text editor, the display of the program also has a one-to-one correspondence to the user's keystrokes. Thus, if the user types a carriage return to break a line of text or begin a new line, a corresponding carriage return/line feed is entered into the text file and displayed on the monitor. Similarly, if a user of a text-based editor hits the spacebar twice in a row, the editor enters two editable spaces into the text file, which are both displayed on the editing screen. This is the approach taken by GNU Emacs, which provides a multitude of "modes" that specialize the behavior of Emacs for programs entered in various programming languages. This is also the approach taken by "vi" another common editor, which provides fewer language-specialized services than Emacs. Finally, most PC-based program editors use this text-based approach.

The chief advantage of text-oriented editors is that their use is familiar. That is, they provide all users with free access to the conventional text editing functionality to which they are accustomed; this gives users great flexibility and minimizes learning costs. However, most text editors do not support full linguistic analysis and therefore have only incomplete and unreliable information about the linguistic structure of programs being edited. For example, many language-based services in Emacs discover structure by matching regular expressions, which by definition cannot capture full linguistic information. These weak-analysis approaches have very little to offer in the way of error diagnosis. Moreover, text editors are not up to the task of providing enough structure to support robust, on-the-fly prettyprinting of the program being entered.

More aggressive text-oriented program editors have been proposed that maintain both full textual and full tree representations of the program being entered. See, for example, the inventor's doctoral dissertation, "User Interaction in Language-Based Editing Systems," UCB/CSD-93-726, Ph.D. Dissertation, Computer Science Division, EECS, University of California, Berkeley, December 1992. This thesis sets out a research system in this category, but there are no known commercial versions. Such aggressive text-editors exact a very high engineering overhead because of the need to build a mapping between related parts of the two representations (i.e., which part of the text corresponds to which part of the structure tree) and to maintain that mapping in the presence of changes as the user types. More importantly, these systems share the fault with structure editors that they provide no useful language-oriented services for those parts of the program that are in the midst of being composed or edited (newly typed text must be analyzed before the system knows anything about it) and those services are of very little use in the presence of syntax errors.

An alternative approach has been explored by a series of research systems under the general category of "structure editors". Two principles are central to this approach: (1) programs are represented internally as syntax trees, and (2) the user's primary mode of interaction with the program is assumed to be in terms of that underlying structure. See, for example, Tim Teitelbaum and Thomas Reps, "The Cornell Program Synthesizer: A Syntax-Directed Programming Environment, Communication of the ACM 24, 9 (September 1981), 563–573 for an early research statement. The commercial descendent of that system is described in: Thomas Reps and Tim Teitelbaum, The Synthesizer Generator Reference Manual, Springer Verlag, Berlin, 1989, Third edition. All practical systems of this sort (for programs) are actually hybrids, meaning that they permit ordinary textual editing under some circumstances. Even so, those circumstances are still expressed in terms of the underlying structure. For example, the user might select a statement structurally, implicitly asking that the structure be treated temporarily as text, and then edit the selected text. When the user thinks editing is complete, the system converts the revised text back into structure if it can. The advantage of this approach is that the editor has access to complete, reliable linguistic information in order to drive services such as prettyprinting.

Structure editors have several failings. First, they restrict the freedom to edit textually that users expect; experience shows that this has severely limited the acceptance of these editors. Second, they provide no useful language- oriented services for those parts of the program being edited textually; those services cannot be provided until the user has eliminated all syntax errors in parts being edited and the system has analyzed the text in order to restore the tree structure. Thus, while the user is editing the editor offers no help at all in that region. Finally, structure-editors typically provide very little support in the presence of syntax errors, since most of the language-based services they provide require a well-formed syntax tree in order to operate. of course, while the user is editing textually, the program is syntactically ill-formed most of the time; it is therefore next to impossible to maintain a well-formed syntax tree of the program as it is being entered.

Thus, there is a need for a program editor that provides the advantages of both types of program editors: the full freedom of textual editing with first class, reliable structural information available all of the time (not just for parts of the program and not just when no errors are present). More specifically there is a need for a program editor that provides a single, non-textual, internal program representation for most services (e.g., language support, prettyprinting, etc.), which is also suitable for programs in progress; i.e., programs which are syntactically ill-formed. It would be desirable for a program editor adopting such an approach to let the user edit the non-textually represented program as if it were text. It would also be desirable for such an editor to be capable of maintaining the internal representation on the fly, as the user types, even in the presence of the inevitable program syntax errors.

To allow this editor to maintain the internal program representation on the fly, the editor should filter out and store apart from the internal representation comments entered by the user. This is because comments are not in the programming language. However, having separated the comments from the non-textual internal representation, there is a need for the editor to store with the comments textual positional information that allows them to be displayed in some useful place that approximates their original, textual position as understood by the reader (and, one hopes, by the original author). Prior structural editors have solved this problem in two different ways.

The Anna system (a research problem at Stanford University) represents one extreme. The Anna system structurally represents programs derived from text files. In this structural representation, sufficient information is retained to reproduce the original source text exactly, comments included. The disadvantage of this type of structural representation is that recording this much information is very costly in terms of storage space.

The other extreme approach is to attach by some decision procedure all comments to particular nodes of the syntax tree maintained in the structured program representation. This approach is based on the assumption that the command was intended to be associated with the chosen tree node in some way. The disadvantage to this approach is that there are no guarantees that the decision procedures correctly associated the comments with the parts of the program structure intended by the author. The result is that comment positioning information is lost, and comments will often end up appearing (in whatever tools use the structural representation) in the wrong places. Thus, there is a need for a structure editor that employs a compact representation of comments separate from the internal program representation and that also retains adequate positional information to allow the editor to display the comments in positions understood by the reader and intended by the author.

This editor should also be able to prettyprint the program being entered based on the aforementioned internal representation of the program and the compact comment representation, as the user types. Finally, this editor should provide a full program structural analysis capability (or parser) that adds useful program interpretation information that cannot be gleaned from the internal representation alone. However, as this full program analysis capability could not generate useful information in the presence of syntax errors, it should not be allowed to interfere with the user's editing, and should only be invoked when desired by the user.

SUMMARY OF THE INVENTION

In summary, the present invention is a user-friendly computer program editor and editing method that meets the needs set out above.

Specifically, the present invention is a computer program editor in which the computer program being edited is internally represented as a stream of tokens and a related list of annotations generated by the present editor on the fly as a user of the present editor edits the computer program. The present editor includes two principal components related to comment processing, a keystroke executive and a comment processor.

The keystroke executive intercepts all keystrokes, or input events, that are part of the event stream generated by a user editing a computer program. The keystroke executive then separates, by detecting comment delimiters, or other triggers, keystrokes related to program comments from keystrokes related to program statements, thus separating program comments from program statements. The keystroke executive forms the token stream by lexically analyzing only the program statement keystrokes. The program comment resources are directed by the keystroke executive, to the comment processor, which stores the text of the comments as annotations in the aforementioned list of annotations and associates with the text of each comment positional information that allows the comments to be located in the token stream for display and printing purposes.

The present invention is also a computer program editing method in which a computer program being edited is internally represented as a stream of tokens and a related list of annotations generated on the fly as a user of the present editor edits the computer program from at least one input device, such as a keyboard and/or mouse. This editing method includes the following steps.

A computer program editor using the editing method of the present invention intercepts all keystrokes, or the event stream, output by the at least one input device as the user edits the computer program. Next, the computer program editor separates keystrokes associated with program comments from keystrokes representing program statements and then forms the token stream representation of the program being edited by lexically analyzing only said program statements. The computer editor makes use of the program comment keystrokes by storing the text of each of said comments separately from the token stream and associating with the stored text positional information allowing the text of each comment to be located in the token stream for display and printing purposes.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
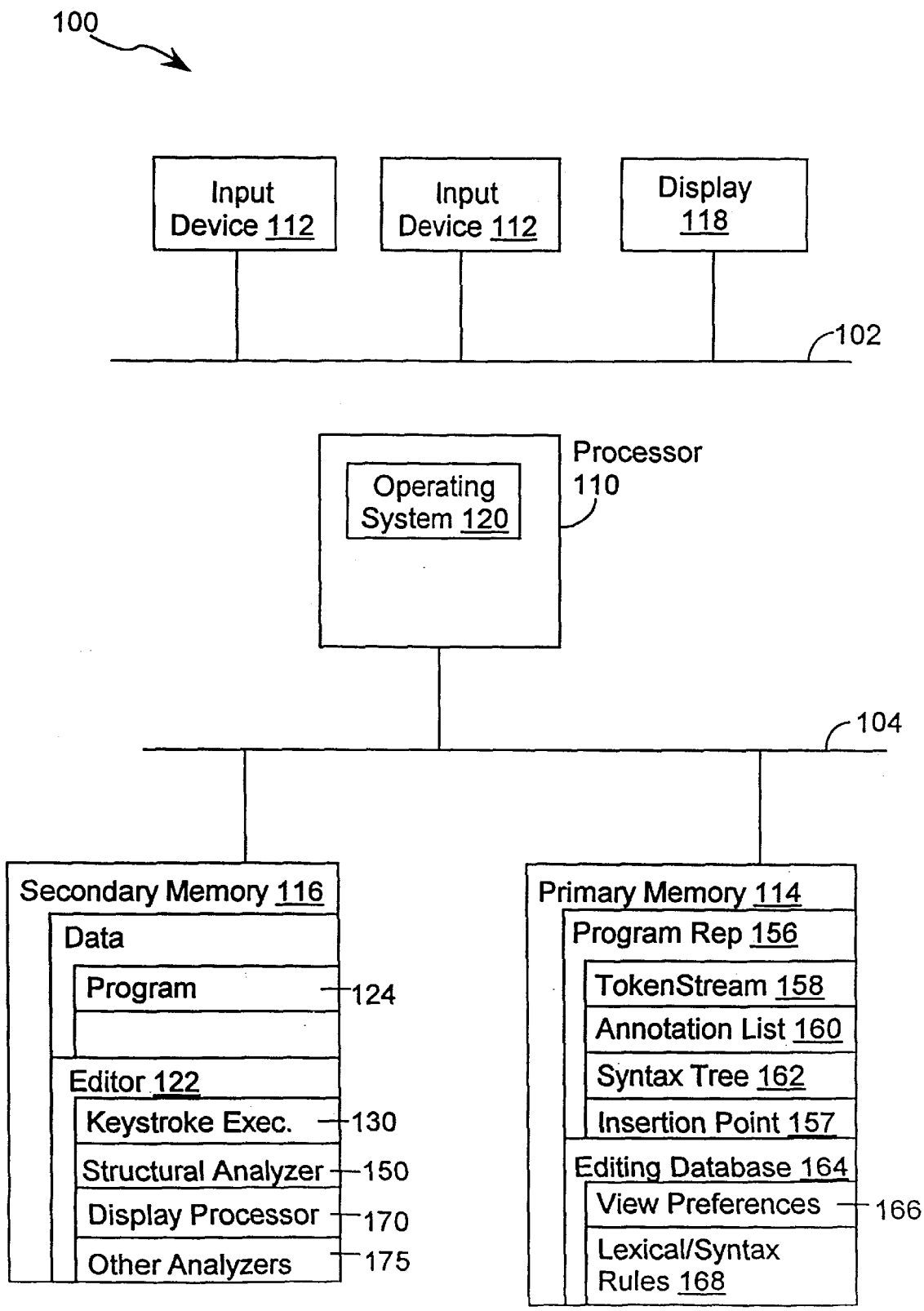
FIG. 1 is a block diagram of a computer system incorporating the computer program editor of the present invention.

Referring to FIG. 1, there is shown a block diagram of a computer system 100 incorporating an editor 122 from which a user can edit a structurally-represented program 124 as if it were represented as a stream of characters. The system 100 has a processor 110 coupled to a primary memory 114 and a secondary memory 116 via a local bus 104. The system also includes at least one input device 112, such as keyboard and/or a mouse, and a display 118 coupled to the processor via a peripheral bus 102. The operation of these elements is set out below, following a glossary defining terms used in the description of the present invention.

Glossary

Anchor
An editable element that is the visible manifestation of an annotation's anchor point.

Anchor Point
A location in a flow associated with an annotation, expressed as a position between two tokens and a rank in the ordering of annotations present in that position. Annotations may be displayed visually at their anchor points (in-line annotations) or elsewhere (out-of-line annotation).

Annotation A discrete body of information that is part of a quantum by virtue of having an anchor point in the quantum's flow.

Annotations are intended to contain meta-information, information that is about source code (for use by people and tools) but which is not part of the code according to language rules. Users specify which annotations are visible in any given view.

Bracketing token
A token that, according to language rules, must be accompanied by a matching counterpart, the two of which together enclose intervening contents in a strictly nested fashion. Examples include parentheses, curly braces, and square brackets.

Display Option
A choice about how the contents of an annotation should be displayed in a view, possibly including, but not limited to the following: invisible (even though active in the view), as a glyph or other holophrast, in the preferred natural mode of the annotation's contents (text, graphics, spreadsheet), and animation.

Editable Element
A member of a flow that appears to be editable by ordinary text-oriented interaction. For example, the insertion point moves over an editable element in a discrete jump. The user may select and delete the visible manifestation of an editable element. Editable elements include the characters that comprise tokens, as well as separators, in-line annotations, anchors and line breaking information.

Flow
A sequence of tokens that, together with its annotations, comprises a quantum.

Footnote
An annotation whose contents are displayed at the bottom of a view or in a specially related visual context, instead of at the anchor point itself. A special mark usually appears at the anchor point of a footnote, as well as with the content, in order to relate them visually.

In-line annotation
An annotation whose contents are displayed at its anchor point (between adjacent tokens or other annotations) in the flow.

Insertion Point
A distinguished position in a view at which certain textual editing operations are intended to take effect, expressed as a position between two editable elements (characters, anchors, separators, and the like) and displayed unambiguously.

Language-based services
Useful mechanisms available to the user that exploit an internal linguistic model of each quantum maintained by the Editor.

Layout Option
A choice about where an annotation should be displayed with respect to its anchor point: one of in-line, marginalia, and footnote.

Marginalia
An annotation whose contents are displayed at the extreme left or right of a view, usually near the same line as its anchor point, instead of at the anchor point itself.

New style
The distinguished style used as a context for new tokens, in place of the syntactic context otherwise computed during an update.

New token
A token that has been entered into or modified in a quantum since the most recent update.

Out-of-line annotations
An annotation whose contents are not displayed visually at its anchor point in a flow. Examples include footnotes and marginalia.

Provisional separator
An ephemeral separator that may appear to the left of the insertion point immediately after the user presses the space bar, in a context where a separator would otherwise be unnecessary and therefore would not appear.

Quantum
A chunk of source code in a programming language, consisting of a flow of tokens and associated annotations. Editor interaction with the contents of a quantum is generally independent of all other quanta; for example there is no token conceptually before the first token of a quantum. Both files and programs are quantums.

Separator
An editable element that acts as a logical "space" in boundaries between tokens and other editable elements. Deletion of a separator directs the Editor to join the two surrounding tokens. Separators normally appear only where needed. In a boundary between language tokens, this means only where the textual concatenation of tokens would form a different token. In more general boundaries, this means when the two adjacent editable elements could meaningfully join or merge into a new object. Cf. token gap.

Style
A named set of visual display attributes that can be applied to tokens or groups of tokens. Style attributes include typeface, size, slant, weight, color, and background color.

Syntactic context
Relationships, defined by language rules, between a token and the tokens that surround it, for example as part of a procedure header, as the defining occurrence of a name, or as an argument name. The syntactic context of a new token can only be determined by an update.

Token
The basic lexical unit or "word" in a programming language: these include identifiers (such as "i"), keywords (such as "int"), punctuation marks (such as ","), and operators (such as "++"). Tokens are the basic unit for some Editor operations. Each character of a token is normally an editable element.

Token Gap
Visual whitespace that horizontally separates the display of adjacent tokens. A token gap is not an editable element, although it may appear to be if there is a separator at the token boundary.

Update
Analysis performed by the Editor in order to improve its internal linguistic model of the source code in a quantum, thereby improving the quality of its language-based services.

View

The visual display of a quantum, perhaps one of many created by the Editor, through which the user may change the quantum by editing (which changes become immediately apparent in all views on the quantum) or may invoke other language-based services.

View Style

A collection of rules, based on language structure and styles, that jointly specify the visual appearance of source code displayed by the Editor.

The system 100 is controlled by operating system software 120 executing in the processor 110. Other executable application software, including the editor of the present invention 122, are stored in the secondary memory 116, as are data files such as the program to be edited 124. As shown in FIG. 1, the editor 122 includes a keystroke executive 130, a structural analyzer 150 and a typographical display facility 170, which are described in depth below. The editor 122 also includes other analyzers, such as a semantic analyzer 175. As the program 124 is edited, the editor constantly updates the internal program representation 156, which is maintained in the primary memory 114. This internal representation 156 has four principal components: a token stream 158 and an annotations list 160, which together compose a program quantum; an optional syntax tree 162, including associated static semantic information;

and an insertion point 157, all of which are described below. Many 5 behaviors of the editor 122 are determined by a customizable editing database 164, also resident in the primary memory 114 during editing, which includes user view preferences 166 and lexical/syntactical rules 168 for the language in which the program 124 is written.

The key distinction between the keystroke executive 130, which performs lexical analysis by applying the lexical rules 168 to the token stream 158, and the structural analyzer 150, which performs syntax analysis on the token stream 158 by applying the syntactical rules 168, is that lexical analysis is local, whereas syntax analysis is global. These two analysis processes correspond to the lexical and syntactical analysis phases of a compiler. To analogize to the analysis of a document written in English, lexical analysis involves breaking down the document into its constituent words and punctuation. On the other hand, syntax analysis involves evaluating the document's sentence structure. Thus, an English syntax analyzer would be able to indicate that the adjective blue is incorrectly placed in the following sentence: "The boat blue is fast." Of course, this sentence would be declared legal if it were translated into French and evaluated by a French syntax analyzer, as adjectives follow nouns in French. Similar roles are played in the program editor 122 by the keystroke executive 130 and the structural analyzer 150. That is, the keystroke executive 130 classifies the program's words according to the parts of speech, or lexemes, of the respective computer language in which the program is written by analyzing only small chunks of code. The structural analyzer 150 then evaluates, based on the lexical properties of the program words, whether a line of code, series of nested if statements, function, or other large scale program structure is correctly formed according to the syntax of the program language. In a significant departure from compilers or structure editors, which may perform either or both of these functions, but always together, in the present editor 122, lexical analysis is independently useful apart from its role as a front end to structural analysis.

When a user invokes the editor 122 against a program to be edited 124, the operating system 120 loads the editor 122 and the program 124 into the primary memory 114 and begins executing the instructions of the editor 122 in the processor 110, at which point the user can edit the program 124. The program 124 could be an existing program or a new program, although that fact has little bearing on the operation of the editor 122, which is more fully described below in reference to FIG. 2.

Figure 2:
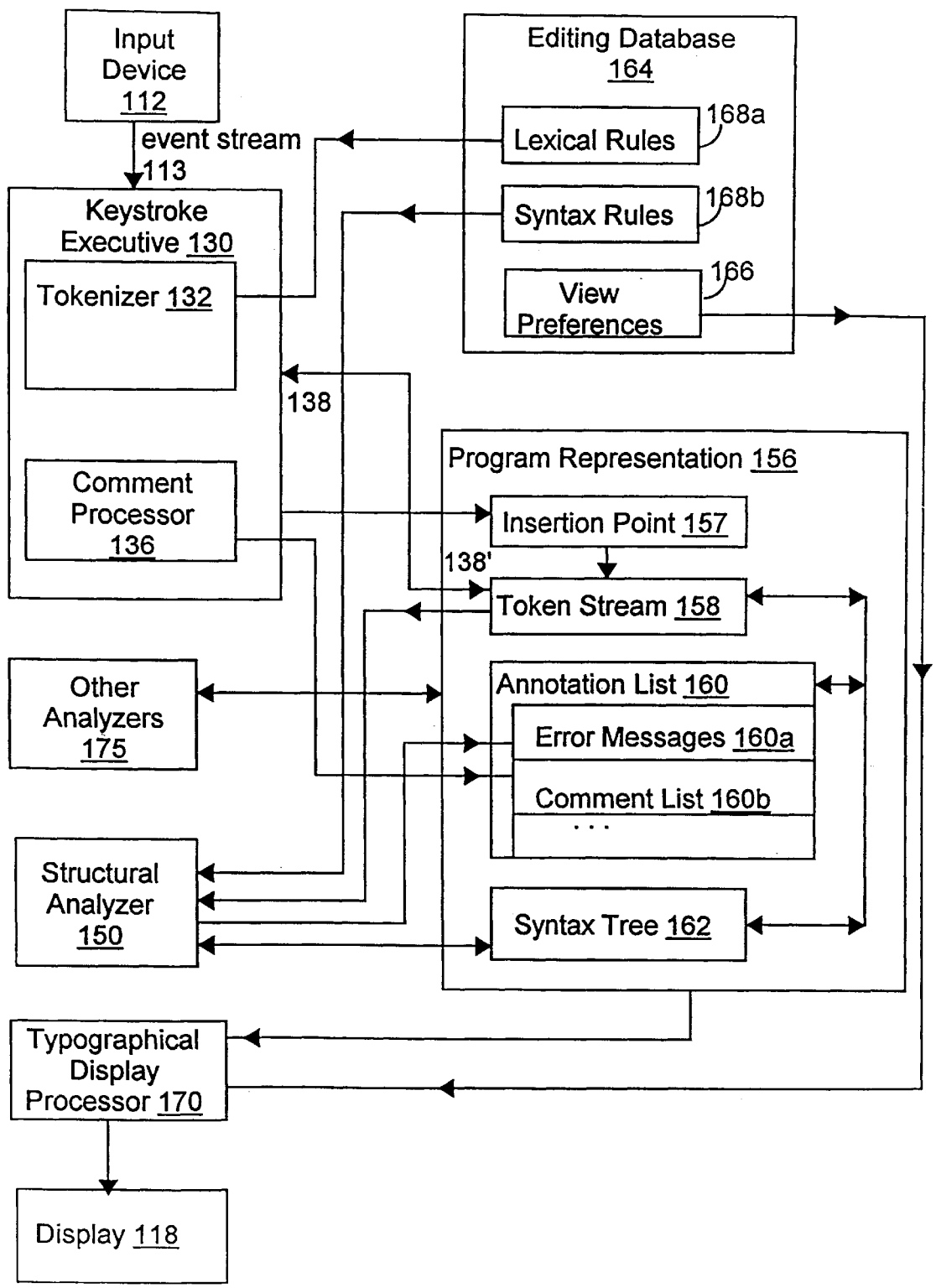
FIG. 2 is a block diagram of a preferred embodiment of the computer program editor of the present invention.

Referring to FIG. 2, there is shown a block diagram illustrating additional details of and functional relationships between the input device 112, editing routines 130, 150, 170, the program representation 156, the editing database 164, and the display 118 while the program 124 is being edited. Additional editor 122 elements not shown in FIG. 1 include the tokenizer 132 and comment processor 136, which are functional blocks within the keystroke executive 130 and the error messages 160a and comment list 160b, which are objects within the annotation list 160. Moreover, in FIG. 2, the lexical/syntax rules 168 from FIG. 1 have been subdivided into lexical rules 168a and syntax rules 168b. The user edits the program 124 by interacting, through the input device 112, with the displayed version 118 of the program being edited. When the input device 112 includes a keyboard, these interactions could include keystrokes directing the editor 122 to move the cursor (when the user uses the cursor control keys), insert a space at the cursor (when the user hits the spacebar), delete the editable element to the left or right of the cursor, insert a character at the cursor (when the user types a character), or break the current line (when the user hits the enter key). When the input device 112 also includes a mouse, these interactions could also include various types of mouse clicks. The input device relays all of these interactions, or input events, to the keystroke executive 130 as an event stream 113.

The keystroke executive 130 is the key component of the editor 122 and is responsible for receiving every input event from the input device 112; updating, based on the event stream 113, the token stream representation 158, and managing the insertion point 157, which defines the position of the cursor with which the user performs all basic editing operations. Consequently, the keystroke executive 130 has read/write access to the insertion point 157 and the token stream 158, and is coupled to the input device 112, from which it receives the event stream 113. The tokenizer 132 is a subfunction of the keystroke executive and executes only when called by the keystroke executive 130, which, in the case of an insert character input event, passes the tokenizer 132 the newest character of the event stream 113, a subset, or token stream segment 138, of the token stream 158 and the position of the character being inserted relative to the token stream segment 138. In addition to the inputs it receives from the keystroke executive 130, the tokenizer 132 has read access to the lexical rules 168a; after executing, the tokenizer 132 returns its result to the keystroke executive 130. The comment processor 136 is another subfunction of the keystroke executive 130, which passes the comment processor 136 all input events 113 related to the editing or entering of program comments. Based on these comment-related input events, the comment processor creates and maintains comment objects, which it stores in the comment list 160b.

At the same hierarchical level of the editor 122 as the keystroke executive 130 is the optional structural analyzer 150, which has read access to the syntax rules 168b and the token stream 158 and write access to the error messages list 160a, to which it outputs syntax error messages. More critically, the structural analyzer 150 is coupled to the syntax tree 162, which it creates, updates and maintains based on the token stream 158 and the syntax rules 168. Unlike the keystroke executive 130, the structural analyzer 150 is not called after ever keystroke of the input device 112, but when its intervention is requested by the user or when there is some other opportunity.

The structural analyzer 150 is optional because the syntax tree 162 it maintains is not required for the program 124 to be edited or displayed in the editor 122. Both of these functions can be adequately performed by the editor 122 solely on the basis of information in the token stream representation. Instead, the syntax tree 162 provided by the structural analyzer 150 is only necessary for fine tuning the prettyprinted display of the program being edited 124 and for ancillary editing services, none of which are essential functions of the editor 122. For the purposes of this document, the term "syntactical analysis" encompass all or part of the syntax and static semantic analysis performed by a compiler in, respectively, its second and third passes over a source code file (the first pass being lexical analysis). As described above, in the art of compilers, syntax analysis determines whether the tokens generated by during the lexical analysis pass are in legal positions according to the syntax rules of the programming language. Static semantic analysis takes an even wider view of the program being compiled. For example, static semantic analysis generates type information for variables used in statements already syntactically analyzed by referring to variable declarations not cognizable by the parser.

The typographical display processor 170 has read access to the data structures 157, 158, 160, 162 composing the program representation 156 and the view preferences 166, which are contained in the editing database 164. Based on the user's view preferences 166, which define the type of editing information the user wishes to be displayed, the typographical display processor 170 typesets or prettyprints the information in the program representation 156 to the display 118, to which the display processor's output is coupled. The term "prettyprinting" means formatting the display of a program or other document, using techniques similar to those used by typesetting programs, to generate a well-formed and aesthetically pleasing image.

While all of these elements are important to the operation of the editor 122, the key improvements made by the editor 122 lie in (1) the form of the internal program representation 156 and (2) the operation of the keystroke executive 130. These aspects of the editor 122 are now described.

As mentioned above, as the program 124 is entered or edited, the keystroke executive 130 receives the event stream 113 and accordingly updates the token-stream representation 156 of the program 124 after each user keystroke or mouse click. Each of the tokens in the token stream represents a "word" of the program 124, where "word" means a symbol or group of symbols that can be classified as any of the basic building blocks, or lexical classes, of a computer language such as strings (e.g., "hello, world"), arithmetic operators (e.g., +, −, /, =), keywords (e.g., char, struct, float) or floating point constants (e.g., 2.0E+5). Thus, as the program 124 is being entered, the keystroke executive 130 is able to create useful program information that would not be available from a text processor, including (1) the tokens or "words" of the program 124 and (2) the lexical types of the tokens (e.g., float constant, string, variable, keyword). Moreover, because the keystroke executive 130 also controls the insertion point 157 of the cursor, with which the user edits the program 124, the keystroke executive 130 is also able to provide on the fly the position of each token within the token stream. Thus, as the user types, the keystroke executive 130 creates a representation of the program 156 in which each word of the program is lexically classified, tokenized, and associated with a unique position in the token stream 158.

This is an ideal representation for a program editor as (1) it can be maintained on the fly as the user types, (2) it provides enough reliable, lexical information that the program can be prettyprinted or typeset as it is entered by the user, and (3) it allows other language-based services to be implemented even when syntax analysis is not successful. This representation is also the ideal compromise between a flexible, but informationally-empty, text representation, and a rigid, but informationally-rich purely-structural representation. Note however that not all information entered by the user or generated by the editor 122 regarding the program 124 is stored in the token stream 158. Other information, such as program comments, which are not actual program statements, are stored in the annotation list 160, as are the syntax error messages generated by the structural analyzer 150 as it parses the program 124. This type of ancillary information is stored apart from the token stream 158 primarily for efficiency reasons; however, because all of the annotations are indexed to appropriate anchor points within the token stream 158, it is always possible to re-associate the annotations and the tokens, which collectively are referred to as a quantum.

In rare editing situations, the keystroke executive 130 modifies the token stream 158 using language-independent rules. For example, if a user deletes the single character of a single character token, the keystroke executive 130 just deletes the token. This requires no language-specific knowledge. However, for most other editing situations, which demand specialized lexical knowledge, the keystroke executive 130 must seek advice from the tokenizer 132, which is an expert in the incremental, lexical analysis of program code, as to how the token stream 158 should be updated in light of new input events 113 typed at the current insertion point 157. In this querying process, the keystroke executive 130 passes the tokenizer 132 a few tokens 138 from the token stream 158 that are adjacent to the current insertion point 157 and a particular request to evaluate an insertion or deletion in light of the token stream segment 138.

The tokenizer 132 then suggests an update 138' to the token stream 158 by interpreting the few tokens in light of the lexical rules 168a provided in the editing database 164. These lexical rules 168a are similar to conventional lexical rules that might be used in a batch-mode lexical analyzer, such as "Lex", but are extended to account for illegal and incomplete lexemes that arise when the program 124 is lexically analyzed as it is being entered.

Anytime the keystroke executive 130 determines that the user is entering a new comment or editing an existing comment, it calls the comment processor 136, which has expertise in maintaining and updating the comment list 160b. While the comment processor 136 is processing a comment, the keystroke executive 130 passes all input events in the event stream 113 to the comment processor 136, which simultaneously updates the appropriate comment in the comment list 160b as if it were a simple text editor (i.e., the comment processor 136 performs no lexical analysis on the input events). When the keystroke executive 130 detects a new comment trigger, such as a comment beginning delimiter, the comment processor 136 allocates a new comment record in the comment list 160b.

Based on the token stream 158 and annotations 160, the typographical display processor 170 typesets, or prettyprints, the program 124 to the display 118 as the user types. In addition to prettyprinting the program 124, the editor 122 can provide a wide range of program editing services, such as language-sensitive support and highlighting, which are also based on the token stream representation 158 of the program 124. Moreover, even though the program is internally represented as a token stream 158, the editor 122 allows the user to interact with the program being edited as if it were internally represented as text; i.e., the behavior of the editor 122 is practically indistinguishable from a word processor. The keystroke executive 130 and typographical display processor 170 of the editor 122 make this text-like editing behavior possible by carefully managing (1) the movement and placement of the cursor, which is the means by which the user interacts with the displayed program 118, and (2) the display of whitespace, or gaps, between adjacent tokens in the token stream 158.

The editor 122, as an option, also allows a user to request a full syntactical analysis, including static semantic analysis, or "update" of the program 124 to supplement the less complete, but still useful, token stream representation of the program 158. Alternatively, the editor 122 may perform an optional update whenever there is an opportunity to do so. In either case, to perform the update, the editor 122 calls the structural analyzer 150, which analyzes the token stream 158 in light of the language-specific lexical/syntax rules 168, and then updates or forms (when the program 124 is newly entered) the syntax tree 162 of the program 124. The information gleaned from the update is then used by the typographical display processor 170 to update the token-based information on the display 118. When the structural analyzer 150 encounters parts of the program 122 not susceptible to syntactical analysis due to the presence of syntax or lexical errors, neither the syntax tree 162 nor display of those parts is modified. Thus, the editor 122 is capable of seamlessly merging information from the two representations on the display 118 in a way that provides all available useful information without hindering the user.

The typographical display facility 170 prettyprints the program 124 to the display 118 based on the token stream 158 from the keystroke executive 130 and/or the syntax tree 162 from the last update generated by the structural analyzer 150. The typographical display processor 170 also displays the various annotations 140, including error messages 160*a* and comments 160*b* alongside the displayed program in an intuitively useful manner determined by the user. The typographical display facility 170 also controls the visual whitespace between displayed tokens and positions the cursor in the displayed program so that the user can edit the displayed program as if in a text based editor rather than a structural editor.

Having briefly surveyed the structure and operation of the principal components of the editor 122, they will now be discussed in detail, beginning with the keystroke executive 130.

Keystroke executive 130

Figure 3:
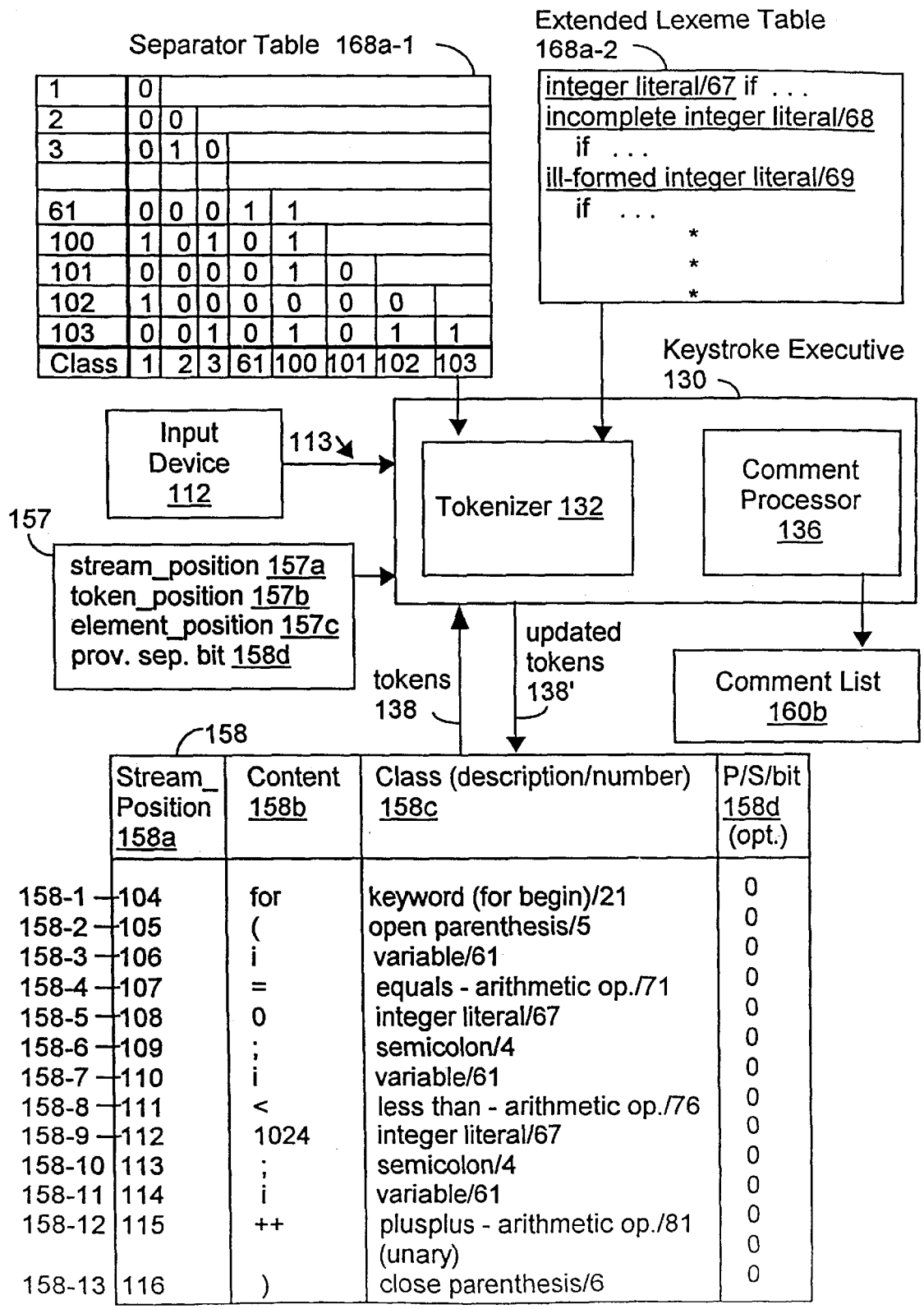
FIG. 3 is a block diagram of the keystroke executive of FIG. 2 and the data structures with which it interacts.

Referring to FIG. 3, there is shown a block diagram of the keystroke executive 130, including additional details of data structures with which the keystroke executive 130 and its subroutines interact. The only system elements shown in FIG. 3 that are not represented in FIG. 2 are the separator table 168*a*-1 and the extended lexeme table 168*a*-2, which are elements of the lexical rules 168. The structure of these two tables 168*a*-1 and 168*a*-2 and the token stream 158 are described below.

As was said above, the keystroke executive 130 transforms, often with the assistance of the tokenizer 132, the input events 113 being entered by the user editing the program 124 into changes to a token stream 158. In the preferred embodiment of the present invention shown in FIG. 3, the token stream 158 is stored as an ordered list of tokens, where each token in the list is characterized by: (1) its position 158*a* in the token stream 158, (2) its constituent symbols, or content, 158*b*, and (3) its lexical type, or class, 158*c*. Additionally, each token may include an optional, boolean, provisional separator bit. For example, the tokens 158-1 through 158-13 occupy positions 104 through 116 in the token stream 158 and correspond to the following C-language for-statement (the examples in this document are drawn from the C and C ++ computer languages) entered from the input device 112 and processed by the input device executive 130: for (i=0; i<1024; i++). Note that the keystroke executive 130 has transformed this one line expression into a series of 13 tokens, each associated with corresponding symbols from the event stream 158*b* and a lexical class 158*c*. Also note that the token class 158*c* is represented in two ways: as a lexical class description (e.g., "keyword (for begin)") and a corresponding numerical class (e.g, "21"); this class number 158*c* is how the other routines and data structures of the editor 122 (e.g., the separator table 168*a*-2 or the typographical display processor 170) refer to the class of a token.

A. Extended Lexeme Table 168*a*-2:

The lexical class information 158*c* is generated by the tokenizer 132 and the keystroke executive 130 according to the lexical rules in the extended lexeme table 168*a*-2. This extended lexeme table 168*a*-2 is structured like lexeme tables used in batch-mode lexical analyzers, or lexers, such as Lex, in that it contains a series of rules defining the lexemes or lexical classes of the language in which the program is being entered. However, the extended lexeme table 168*a*-2 is larger than a conventional lexeme table for the same language. This is because the extended lexeme table 168*a*-2 must account for the many "incomplete" and "ill-formed" tokens that are formed as the user enters and/or edits the program 124, which is lexically analyzed by the keystroke executive 130 or the tokenizer 132 after every input event.

For example, as would a conventional lexeme table, the extended lexeme table 168*a*-2 includes a lexical rule that defines a legal integer literal (class 67) expressed in hexadecimal ("hex") format, which, in C/C++, corresponds to the string "0x" followed by a series of symbols "#", where "#" is an integer between 0 and 9 or a character between A and F. However, unlike a conventional lexer, the extended lexeme table 168*a*-2 also includes rules that define incomplete integer/hex literals (the string "0x" followed by nothing else), and ill-formed integer/hex literals (the string "0x" followed by at least one symbol "$", where "$" is not an integer between 0 and 9 or a character between A and F). These extended lexemes (i.e., incomplete and ill-formed lexemes) are necessary in the present editor 122, which aims to provide useful lexical information regarding the lexical classes of the tokens in the token stream 158 as the user inputs the corresponding event stream 113. Such extended token information is not necessary in a conventional lexer, which, as the front end of a compiler, simply rejects either kind of token as illegal without any further attempts to classify them. The preceding discussion is a brief description of the extended lexeme and on-the-fly analysis of tokens. A more complete explanation is provided in the same inventor's co-pending U.S. patent application, Method and Apparatus for Diagnosing Lexical Errors, Ser. No.: 08/305,220, filed Sept. 13, 1994.

For example, consider the following event stream 113 which is generated by a user typing an integer hex literal, and the corresponding token stream representation 158, which is generated keystroke-by-keystroke by the keystroke executive 130. In this illustration, the character just typed by the user is underlined and the corresponding insertion point 157 in the token stream 158 after the keystroke is marked with a "¦" character.

TABLE 1

| Event stream 113 | Position 158a | Content 158b | Lexical Class 158c |
|---|---|---|---|
| 0 | 1 | 0¦ | Integer literal |
| 0x | 1 | 0x¦ | Incomplete integer literal |
| 0x5 | 1 | 0x5¦ | Integer literal |
| 0x5H | 1 | 0x5H¦ | Illegal integer literal |

In this example, note how the lexical class changes as the user types.

This is because the keystroke executive 130 lexically analyzes the event stream 113 after each user keystroke. Also note that the token stream position 158a does not change as the user's keystrokes have the effect of modifying a single token, which, in this example, is the first token. Rather, what does change after each token stream 158 update is the insertion point 157, which marks both the keystroke executive's work position in the token stream 158 and the position of the cursor (displayed to the user on the display 118), with which the user interacts with the program being edited.

B. Token Boundaries

In another marked contrast to text editors, the keystroke executive 130 does not represent in the token stream 158 spaces typed by the user between program tokens (however, as will be discussed later, the keystroke executive 130 does represent in the token stream 158 typed spaces in string and character literals). Instead, the textual role played by whitespace in conventional text editors is replaced in the token stream 158 by token boundaries maintained by the keystroke executive 130 as the user types. Most token boundaries are implicit in what the user types and are recognized by the keystroke executive 130 and tokenizer 132 through lexical analysis. At such implicit boundaries there is no editable element between tokens.

For example, recall that the tokens 158-1 through 158-13 in the token stream 158 shown in FIG. 3 correspond to the event stream "for(i=0;i<1024;i++)". This expression could have been entered from the input device 112 in many ways, all semantically equivalent; e.g., the user might have typed the event stream 113 as "for_(i_=_0;_i<1024;_i ++)" or as "for (i=0;_i<1024;_i++)", where the "_" symbol corresponds to a typed space in the event stream 113. To the user entering this text, these spaces play an important role. For example, they provide visual separation between adjacent program words and, as they are directly displayed by text editors, are an integral component in rendering a pleasing display of the program 124. However, none of these spaces are necessary in a semantic sense; i.e., their presence or absence does nothing to change the meaning of the for-loop expression (although in some situations, covered below, spaces do provide semantic information). Consequently, the keystroke executive 130, in tokenizing these event streams, discards any spaces entered by the user between the tokens 158-1 through 158-13. That is, the boundaries between the tokens 158-1 through 158-13 are implicit, being lexically inferable from the lexical classes of the adjacent tokens. At such implicit boundaries there are no editable elements between the tokens.

1. Separators

There are also ambiguous token boundaries, where the program language would require a space in a purely textual representation (i.e., ambiguous boundaries are token boundaries where a space would be required in the textual equivalent of the token stream to preserve the boundary). In these cases, the keystroke executive 130 creates a separator, an editable element that acts something like a space. More specifically, in the present editor 122, a separator will only be associated with adjacent tokens in the token stream 158 that could legitimately be merged into one token. Generally, this determination is made by comparing the content of what the user is typing to the language definition of the program such as defined in the extended lexeme table 168a-2.

For example, no separator is needed between the two tokens "for" and "(" in the token stream "for(" because those two tokens cannot legitimately be merged. In other words, no space is required in the textual equivalent of the token stream to preserve the boundary between the program words "for" and "("; which is not an ambiguous boundary. As a result, regardless of whether the use types "for_(" or "for(", the keystroke executive 130 always gives the same token stream without a separator: "for", "(".

In contrast, if the user types two adjacent "+" characters without any intervening spaces, the keystroke executive 130 generates a single corresponding plus-plus token "++", but if the user types a plus character "+" followed by a space "_" then another plus character "+", the keystroke executive 130 returns a different token stream with two tokens and an intervening separator: "+□+". Note that the separator in the two token example is not required because the token stream representation of the event stream "+_+" would be ambiguous without it; in fact, the event stream "+_+" could be unambiguously represented as two adjacent plus ("+") tokens having an implicit token boundary. This separator is also not required to create a pleasing display of the program 124 as the typographical display processor 170 displays visual whitespace between adjacent tokens based on their respective lexical classes, not user-entered spaces. Rather, the separator in the token stream 158 corresponding to the event stream "+_+" is required so that the user can edit the corresponding stream as if it were text. I.e., by providing an editable separator corresponding to the displayed whitespace between the two plus tokens, the editor 122 gives the user an object to delete, whose deletion instructs the keystroke executive 130 to join the separated tokens into the single token, "++". If this separator were not present, there would be no simple, text-like way in which a user could join the two tokens.

For example, consider the editor's behavior if a necessary separator were missing. If there were only an implicit boundary between the tokens (i.e., if the event stream "+_+" were internally represented as the two adjacent tokens "+" and "+"), the user might place the cursor ("¦") in the whitespace between the displayed tokens as follows: "+¦+", and hit the rubout key, thinking this action should delete the space between the tokens, thus textually joining them. However, because the only editable element to the left of the cursor is the leftmost plus token, this action would only result in the keystroke executive 130 deleting that leftmost token. Thus, adding a separator between the two plus tokens allows the user to join the two tokens in a familiar, text-like manner (i.e., by putting the cursor between the separator and the rightmost plus token, then deleting backwards). Moreover, because a separator serves only an editing purpose and not a visual (whitespace) purpose, the keystroke executive 130 will allow only one separator between tokens, no matter how many spaces a user enters. In addition to serving as an editable element, a separator acts as an immutable token boundary; i.e., adjacent tokens with an intervening separator may never be joined as a side effect of other operations.

The preceding discussion set out what separators are; i.e. they are editable elements that act like textual space and define immutable token boundaries. The following discussion sets out various ways in which separators are implemented in the present editor 122.

a. Separators-Implementation:

As stated above, the tokenizer 132 or the keystroke executive 130 determines whether a separator is required in each token boundary based on lexical properties of the two surrounding tokens. In the preferred embodiment of the present invention, the keystroke executive 130 does not actually represent any required separators in the token stream 158, but decides, on the fly, whether a separator exists or should exist between two tokens. Alternatively, based on the same type of decision procedure, the keystroke executive could actually add an explicit separator to the token stream 158.

This decision procedure can be implemented by the editor 122 in two different ways, one approximate but conservative (meaning that some unnecessary separators are introduced into the token stream, but that no necessary separators are omitted), the other exact (meaning that only necessary separators are introduced into the token stream). The approximate procedure must be conservative as it is ok with respect to editing behavior to have additional separators but absolutely critical not to omit necessary ones.

The preferred embodiment of the present invention implements the approximate but conservative approach. In this approach, the keystroke executive 130 or tokenizer 132 determines the need for a separator between two tokens by referring to the separator table 168a-1 on the basis of the lexical classes 158c of the adjacent tokens. The separator table 168a-1, as is shown in FIG. 3, consists of a grid of boolean separator values (0/1->no separator/separator) indexed by the lexical class of two adjacent tokens in the token stream 158. For example, if the leftmost of the two adjacent tokens has a class 158b of "101" (reading the vertical axis of the table 168a-1), and the rightmost has a class 158b of "100" (reading the horizontal axis of the table 168a-2), they would be separated by a separator as their intersection in the separator table 168a-1 has a boolean separator value of "1". This is an approximate approach because it is based on the lexical classes of the adjacent tokens and not the particular tokens being lexically analyzed. For example, class-oriented rules in the separator table 168a-1 would indicate that a separator should always be included between an identifier on the left and a floating point number on the right. This rule is required because a user might occasionally want to join these types of tokens; e.g., where the left token is "A" and the right token is the floating point number "1E5", these two tokens could legitimately be merged into the single token identifier "A1E5". However, because this rule is conservative, it introduces an unnecessary separator in other situations where the textual equivalent of adjacent tokens of the same respective classes have an unambiguous boundary; e.g., where the left token is "A" and the right token is ".1E5", the tokens cannot legitimately be joined. Using this approximate approach it is ok to add unnecessary separators (although this does require some special editing approaches), but it is not ok to eliminate necessary separators. For an example of such a case where the separator is critical, see the "++" example set out above. Thus, the approximate approach embodied in the extended lexeme table 168a-2 errs on the side of adding unnecessary separators.

As intimated above, this approximate and conservative approach does cause some editing problems, such as when a user tries to delete an unnecessary separator such as the one associated with the boundary between the token "A" on the left and the token ".1E5" to the right (in this case the editor 122 simple moves the cursor over the unnecessary separator). However, this table lookup method is a fast, resource-efficient approach that can be executed on the fly as the user of the editor 122 generates the event stream 113. Moreover, it should be noted that unnecessary separators occur rarely in practice in languages such as C and C++ because the adjacent tokens that would give rise to an unnecessary separator never legitimately occur next to each other.

Like the approximate approach, the exact decision procedure is rule-based, but rather than being token class-oriented, this latter approach evaluates the specific adjacent tokens according to a set of lexical rules to determine whether adjacent tokens could legitimately be joined. For example, the efficient approach would prescribe a separator between the tokens "A" and "1E5" but not between the tokens "A" and ".1E5". This approach eliminates editing side effects as described above, but is more computationally intensive.

2. Provisional Separators

Provisional separators are a temporary record that the user has just hit the space bar in a place, such as between two tokens, where there is no need of an additional separator. The keystroke executive 130 or tokenizer 132 makes use of these provisional separators based on the assumption that the user must have typed the space for a good reason, thus, a record of the space should be preserved, if only for a short time. This allows the user to enter a new token whose boundary with the previous token is ambiguous, in which event the keystroke executive 130 eventually converts the provisional separator to an ordinary separator. If the user types a new token whose boundary with the previous token is not ambiguous, the keystroke executive 130 merely eliminates the provisional separator. In the preferred embodiment of the editor 122, there can be only one provisional separator in the token stream 158, and it only exists immediately to the left of the insertion point (described later).

For example, assume that the user wishes to modify the text expression "a=b" to read "a_c=b". In a text editor, a typical user might accomplish this change by placing the cursor to the left of the equals sign in the first expression, hitting the spacebar and typing a "c" following the space. However, in the editor 122, the event stream "a=b" is actually represented as the token stream 158 shown in Table 2 consisting of three tokens with no intervening separators.

TABLE 2

| position 158a | content 158b | class 158c | p/s/bit 158d |
| --- | --- | --- | --- |
| i | a | variable/61 | 0 |
| i + 1 | = | equals-arith. op./71 | 0 |
| i + 2 | b | variable/61 | 0 |

Thus, in the absence of a provisional separator, when the user places the insertion point 157 between the tokens "a" and "=" and strikes the spacebar, the keystroke analyzer 130 would make no corresponding change in the token stream 158. I.e., the space typed by the user would not be recorded or recoverable. This is because the insertion point 157 already corresponds to an implicit token boundary between unambiguous tokens. Thus, when the user goes on to type the "c", which textually has an ambiguous boundary with the token "a" (i.e., "a_c" has a different textual meaning than "ac"), the keystroke executive 130 would not introduce the necessary separator at the boundary between the "a" and "c" tokens and instead would form the updated token stream "ac=b". However, as the present editor 122 assumes that the user must have typed the seemingly superfluous space for a reason, it provides a means (the provisional separator) for representing this kind of editing activity in the internal token stream 158, which allows the editor to change the provisional separator to an ordinary separator when the user enters the "c".

In the preferred embodiment of the present invention, the provisional separator is represented as a boolean provisional separator bit 158d (0/1->set, not set) in the insertion point data structure 157. Thus, in the present editor 122, there is only one provisional separator permitted in the token stream 158, and, if present, it is always understood to exist only to the left of the insertion point. This is because a provisional separator is an ephemeral object created by the editor 122 as a result of an immediately preceding input event. In another preferred embodiment of the present invention, the provisional separator is represented as an additional bit in each token in the token stream 158 indicating whether the token is followed by a provisional separator.

To allow the kind of editing behavior expected by users of text editors, the keystroke executive 130 or tokenizer 132 sets the provisional separator bit 158d whenever the user types a space at an existing token boundary where no separator is present. Thus, in the above example, the tokenizer 132 sets the provisional separator bit 158b when the user types a space between the "a" and "=" tokens; and the resulting token stream would read: "a■=b" where "■" represents the provisional separator 158b at the insertion point 157). After the tokenizer 132 inserts the provisional separator in the token stream, the typographical display processor 1170 will display the provisional separator as a space, but possibly in a way that is distinct from a displayed ordinary separator. Generally, a provisional separator 158b is ephemeral, being reset to 0 by the keystroke executive 130 and possibly replaced by an ordinary separator depending on the next user keystroke. In the example above, assuming that the user types a "c" at the provisional separator "■", the tokenizer 132 will appropriately replace the provisional separator with an ordinary separator, meaning that the token stream 158 now read s "a□c=b". The tokenizer uses the ordinary separator in this case as the token boundary between the tokens "a" and "b" which are both of the lexical class "variable/61", is ambiguous. If the user typed a plus sign "+" at the provisional separator in stead of "c" the tokenizer 132 would remove the provisional separator completely as the resulting boundary between "a" and "=" in the expression "a+=b" would be unambiguous. Note that the tokenizer 132 will never enter more than one provisional separator between adjacent tokens into a flow.

C. Lexical Analysis Process

As set out above, maintaining the token stream 158 on the fly requires the keystroke executive 132, with the assistance of the tokenizer 132, to recognize all of the lexemes allowed by the language in which the program is being entered. Lexical analysis to this extent is well-known in batch-oriented tokenizer's, such a s "Lex", which are executed on a program after the program has been entered. However, to maintain the token stream 158 on the fly completely and accurately, the keystroke executive 130 and the tokenizer 132 must also recognize the ill-formed and incomplete lexemes that are formed while a user of the editor 122 is typing.

Generating this kind of extended lexical information, e.g., whether a token is a legal or incomplete floating point expression, requires the keystroke executive 132 to analyze the impact of each user keystroke in the context of a small portion of the existing token stream 158 (called a token stream segment 138), insertion point 157, extended lexeme table 168a-2 and separator table 168a-1. Of course, the number of tokens in the token stream segment 138, and their positions relative to the current insertion point depends on the lexical characteristics of the programming language in which the program is being entered. For example, in C or C++, the keystroke analyzer 130 generally needs to analyze no more than the tokens adjacent the token containing the insertion point.

While the keystroke executive 130 can sometimes update the insertion point 156 and token stream 158 by itself (e.g., when a user deletes the single character of a single character token), in most situations it must consult with the tokenizer 132, which will suggest an update to the token stream segment 138 based on the extended lexical rules 168a-2. In such a consulting situation, the keystroke executive 130 queries the tokenizer 132 differently based on whether the current editing operation is an insertion or a deletion. In the case of an insertion, the keystroke executive 130 passes the tokenizer 132 a token stream segment 138 consisting of the token to the left of the insertion point and all of the tokens to the end of the current line of text, the character to be inserted, and the position at which that character is to be inserted, and asks the tokenizer 132 to recommend minimal changes to the token stream segment 138 that reflect the textual modification. In response, the tokenizer 132, which is a narrow expert in lexical analysis, knowing nothing of the insertion point 157, visual whitespace, or cursor behavior, performs an incremental lexical analysis on the token stream segment 138 by inserting the new character into the textual equivalent of the token stream (treating all separators as spaces) in the place indicated by the keystroke executive 130, and then analyzing the result as if it were text. Because the tokenizer 132 tries to make minimal changes to the token stream 138, in most situations changes to the token stream will not go beyond the token to the right of the insertion point. The tokenizer 132 then returns its suggested token stream update to the keystroke executive 130. It must also return the position of the inserted character relative to the updated token stream segment 138' so that the keystroke executive 130 can update the insertion point appropriately.

When the editing action is a delete, the keystroke executive 130 identifies the editable element in the token stream segment 138 the user wants to delete and asks the tokenizer 132, "if this element were to be deleted, how should the token stream segment 138 be updated?" As in the case of an insertion, the tokenizer 132 computes the minimal change to the token stream segment 138 and returns its suggested update and the offset of the deleted character relative to the updated token stream segment 138' to the keystroke executive 130.

The keystroke executive 130 is then free to accept or reject the suggestion based on higher level information to which only it has access. The keystroke executive 130 then writes the updated token stream 138' back to the token stream 158 and updates the insertion point 157. This process is described in greater detail in a pseudocode fragment in Pseudocode Insert A, included at the end of the detailed description.

As an example of a case where the keystroke executive 130 rejects the suggestion of the tokenizer 132 assume that a user about to create a comment has just typed the first character of a C-style comment beginning delimiter (i.e., "/"). The keystroke executive 130 passes this keystroke to tokenizer 132, which concludes that this keystroke is a C division token; therefore it suggests that the keystroke executive 130 replace the token stream segment 138 with an updated token segment 138' including the new division token. At this point, the keystroke executive 130 has no way of knowing that the user is typing a comment; therefore, it accepts the tokenizer's suggestion. Now assume that the user has just typed the second character of the comment beginning delimiter (i.e., "*"), which would look to an ordinary lexer like a C multiplication token. In the preferred embodiment of the present invention, the tokenizer 132 using extended lexical analysis rules is aware that it should join these two tokens together to form a special token ("/*") that is not in the language. This causes no confusion because neither C nor C++ allow a division token to be meaningfully adjacent to a multiplication token. Thus, the tokenizer 132 suggests that the keystroke executive update the token stream 158 by replacing the division token "/" with the special token "/*". However, and this is an area that will be covered in depth later, a basic tenet of the editor 122 is that comments and any other non-program information be kept separate from the token stream 158, simplifying lexical analysis of the program 124. Consequently, the keystroke executive 130 rejects the replace suggestion made by the tokenizer 132 and instead deletes the "/" from the token stream 158 and calls the comment processor 136 to create a new comment. This commenting process is described below in greater detail.

The extended lexical type data generated by the tokenizer 132 are critical to the success of the present editor 122 as they provide information to the typographical display processor 170 that allows it to typeset the line being edited before it has been completed by the user and before it has been syntactically analyzed by the structural analyzer 150. For example, based on extended lexical analysis results, the prettyprinter 170 is able to typeset the incomplete floating point token "1.0E" or the illegal token "1.0E@" according to the display specification for a completed floating point expression, while displaying the extended lexical type information (e.g., that the token is incomplete or ill-formed) in such a manner as to assist the user in completing or correction the token (e.g., by highlighting the illegal token in red). This would not be possible in a conventional batch processor, which could not handle the torrent of incomplete tokens generated as the user enters the program.

Of course, the fact that the editor 122 can provide lexical information that is displayed by the prettyprinter as the user types would be of no value to users unless they could easily interact with and edit the program being displayed. Thus, to achieve a high level of user acceptance, users should be able to interact with the displayed program as if it were textually, not structurally, represented. This implies that cursor movement and whitespace representation in the present editor should approximate that in conventional text based editors for the most common editing operations. How the present editor 122 does this, in the context of updating the token stream 158, is set out below.

1. Token Stream Updating Methods for Text-Like Cursor Control

In the present editor 122, a user edits a computer program 124 by interacting with the displayed program through a cursor whose cursor position is defined by the current insertion point 157 in the token stream 158. The current insertion point 157 is maintained by the keystroke executive 130, which intercepts all of the user keystrokes and transforms them into the token stream 158; the typographical display processor 170 then communicates the current insertion point 157 to the user via a cursor at the appropriate place within the prettyprinted token stream 158 on the display 118.

In a text-oriented editor, such editing behaviors are a simple matter—the editor simply moves the cursor from character to character as the user edits the underlying text, which has an internal representation that, generally, corresponds one-to-one with the displayed program. This simple heuristic also applies to the situation when the user moves the cursor from one program word to another across one or more spaces, as spaces are editable elements in conventional text editors.

However, the present editor 122 internally represents the program 124 as a token stream 158, small bits of which (i.e., token stream segments 138) are updated on the fly by the keystroke executive 130. Moreover, there are no inter-token spaces in the token stream representation 158; instead, the tokens are separated either implicitly or by separators. Consequently, when the user edits the event stream 158, the keystroke executive 130 or the tokenizer 132, in determining how to update the token stream segment 138, must take into account (1) the user's keystroke/editing action (2) the position of the insertion point/cursor relative to the tokens and, possibly, separators, composing the token stream segment 138, and (3) the content 158b and lexical class 158c of the tokens in the token stream segment 138. Additionally, the keystroke executive 130 must update the insertion point appropriately, and the typographical display processor 170 must display the cursor in a screen position that (1) corresponds to the insertion point 157 and (2) is intuitive to the user. As lexical classes have been discussed already, this section will explain the methods and rules by which the keystroke executive 130 and/or the tokenizer 132 computes an updated token stream segment 138' and insertion point 157. The sole purpose of these methods and rules is to give the user the impression that they are editing a stream of editable elements in a conventional text editor.

The first issue in defining updating rules for the keystroke executive 130 is to consider the range of editing operations permitted by the editor 122. The present editor 122 supports three basic text-oriented editing operations. These three basic editing operations are: (1) inserting a non-space character; (2) deleting an editable element and (3) inserting a space. The editor 122 also supports basic navigating operations such as mouse clicks and cursor forward and cursor backward keystrokes. These navigating operations are handled in the obvious way, by moving the insertion point over the editable elements. Given that the token stream of the present invention includes tokens and separators, and that no two separators can be adjacent except in the situation where one of the separators is a provisional separator, the insertion point 157 can occupy many possible positions with respect to an individual token and the aforementioned separators. However, of these myriad insertion point positions, only the six basic positions shown in Table 3 are necessary to the following discussion of the token stream and insertion point updating performed by the keystroke executive 130 (i.e., Table 3 is not exhaustive). Each row of Table 3 describes the insertion point, shows its associated index, which will frequently be referred to in the following discussions, and also includes an example of a token stream segment ("n: in int") showing the respective insertion point 157. In these examples, "(", "n", ":", "in", "int" and ")" are all tokens and the vertical bar ("|") marks the insertion position 157 and the corresponding cursor position. Ordinary separators and provisional separators are shown as a hollow box "☐" and a filled box "■" respectively.

TABLE 3

Basic Insertion Point Positions

| Position | | Example |
|---|---|---|
| 1: | Within a token. | (n: i|n☐int) |
| 2: | Between tokens on a line, no separator. | (n: |in☐int) |
| 3: | Between tokens on a line, at left of a separator. | (n: in|☐int) |
| 4: | Between tokens on a line, at right of a separator. | (n: in☐|int) |
| 5: | Between tokens on a line, at right of provisional separator. | (n: ■|in☐int) |
| 6: | Between tokens on a line, at left of a sep, at right of prov. sep. | (n: in■|☐int) |

Thus, the keystroke executive 130 must have access to the following information to unambiguously locate the cursor in the token stream 158:

(1) the token-oriented position (one of the six values from above), (2) if the token-oriented position is "1", the token-stream position of the token in which the insertion point is positioned, or, if the token-oriented position is not "1", the token-stream position of the token to the right of the insertion position;

(3) the specific editable element to the right of the insertion point; and (4) the provisional separator bit 158d.

Except for the provisional separator bit 158d, this cursor positioning information can be stored in a data structure accessible to the keystroke executive 130 or can be determined on the fly by the keystroke executive 130 from the editing context. The preferred embodiment of the present invention adopts the latter approach; however, for the purposes of this application, the four values (1) through (4) are illustrated as the token_position 157b, the text_stream_position 157a, the editable_element_position 157c, and the provisional separator bit 158d of the hypothetical insertion point data structure 157. Having discussed the basic insertion point positions, the three methods by which the editor 122 executes the three basic editing operations are now set out. When reviewing the tables illustrating these various methods, please note that the editing outcomes shown in the tables reflect notions of what is natural cursor and editing behavior in text editing (the goal of the editor 122 being to provide text-like editing of structurally-represented programs). In most cases, the outcomes follow obviously from the editing operation. In a very small percentage of the cases, the outcomes reflect presumed user preferences which could be resolved differently depending on the user. Thus, these outcomes should be understood to reflect design choices made in the invention, other outcomes being equally consistent with the teachings of the present editor 122. Moreover, not all possible outcomes are shown, or if shown, discussed as the following discussions will focus on those editing outcomes that provide insight into important aspects of the keystroke executive's behavior. These editing methods are also described by the pseudocode included herein as Pseudocode Insert B, included at the end of the detailed description.

The keystroke executive 130 also includes heuristics that determine how the cursor position/insertion point should be updated following editing actions that cause a separator to be added or removed from the token stream 158. One such heuristic follows: when an editing operation results in the addition of a separator in the token stream, place the cursor behind the new separator, where "behind" means to the right of separators added to the left of a deleted character, and to the left of separators added to the right of an inserted character. The idea behind this heuristic is to keep the cursor from hopping past new separators to render the behavior of the cursor familiar to users of the editor. Of course, this and all other heuristics might not seem natural to users who do not share the same set of expectations about "natural" editor performance. Consequently, any number of cursor control heuristics can be written into the keystroke executive 130.

a. Inserting a Character

When the user types a non-space character, the keystroke executive 130 or tokenizer 132 inserts the character into the token stream segment 138 at a position corresponding to the insertion point 157; lexically analyzes the results, treating separators as immutable token boundaries; and computes changes to token boundaries and classes. The resulting updated token stream segment 138' is then written back to the token stream by the keystroke executive 130.

In this process, the lexical analysis step proceeds left to right, starting at the beginning of the left-most token touching the insertion point. For example, Table 4 shows how the tokenizer 132 responds to the insertion of the character "x" in representative flows at the various insertion points. Note that in every case shown, the insertion point is displayed to the right of the new character "x" when the operation has been completed.

TABLE 4

Insert an "x"

| Position | | Example | Editor Response | Final Position |
|---|---|---|---|---|
| 1: | Within a token. | (n: i|n☐int) | Change "in" to "ixn"; reanalyze. | 1: "ix|n☐int" |
| 2: | Between, no sep. | (n: |in☐int) | Change ":in" to ":xin"; reanalyze. | 1: "n: x|in☐int" |
| 3. | At left of a separator. | (n: in|☐int) | Change "in" to "inx"; reanalyze. | 3: "inx|☐int" |
| 4. | At right of a separator. | (n: in☐|int) | Change "int" to "xint"; reanalyze. | 1: "in☐|xint" |
| 5. | At right of a prov. sep. | (n: ■|in int) | Change "in to "xin"; reanalyze. | 1: "n: x|in☐int" |
| 6. | At left of a sep., right of a prov. sep. | (n: in■|☐int) | Analyze "x" by itself; insert new token | 3: "n: in x|☐int" |

Referring to Table 4, the "Final Position" in each case results from the example shown. Other final positions are also possible; for example, assuming that the cursor is in position 1, e.g., "|n", and the user types the token "+" instead of "x", lexical analysis would result in an updated token stream segment 138' of "+|", consisting of three tokens with only implicit boundaries, where the final insertion point, or cursor position, is position 2 (between tokens—no separator).

Table 5 presents various examples in which the keystroke executive 130 would place the final cursor position in different final positions than those shown in Table 4. Unlike Table 4, these examples involve the insertion of different characters in different illustrative token stream segments. Thus, the "Example" column shows the existing token stream (bolded) and the user keystroke (in italics). The "Final Position" column shows the final cursor/insertion point position and the corresponding updated token stream segment, including the new insertion point marked with the "|" symbol. Ordinary and provisional separators are shown as in Tables 3 and 4.

TABLE 5 additional insert examples

| Position | Example | Editor Response | Final Position |
|---|---|---|---|
| 1: Within a token. | a|b; type "+" | Change "ab" to "a+b"; reanalyze. | 2: "a+|b" |
| 2: Between, no sep. | a|); type "+" | Change "a)" to "a+)"; reanalyze. | 2: "a+|)" |
| 3. At left of a separator. | +|☐+; type "+" | Change "+☐+" to "++☐+"; reanalyze. | 2: "++|+" |
| 4. At right of a separator. | a☐|b; type "+" | Change "a☐b" to "a☐+b"; reanalyze. | 2: "a+|b" |
| 4. At right of a separator. | a☐|.1; type "a" | Change "a☐.1" to "a☐a☐.1"; reanalyze. | 3: "a☐a|☐.1" |
| 5. At right of a prov. sep. | a■|); type "+" | Change "a■)" to "a■+)"; reanalyze. | 2: "a'|)" |

Figure 5:
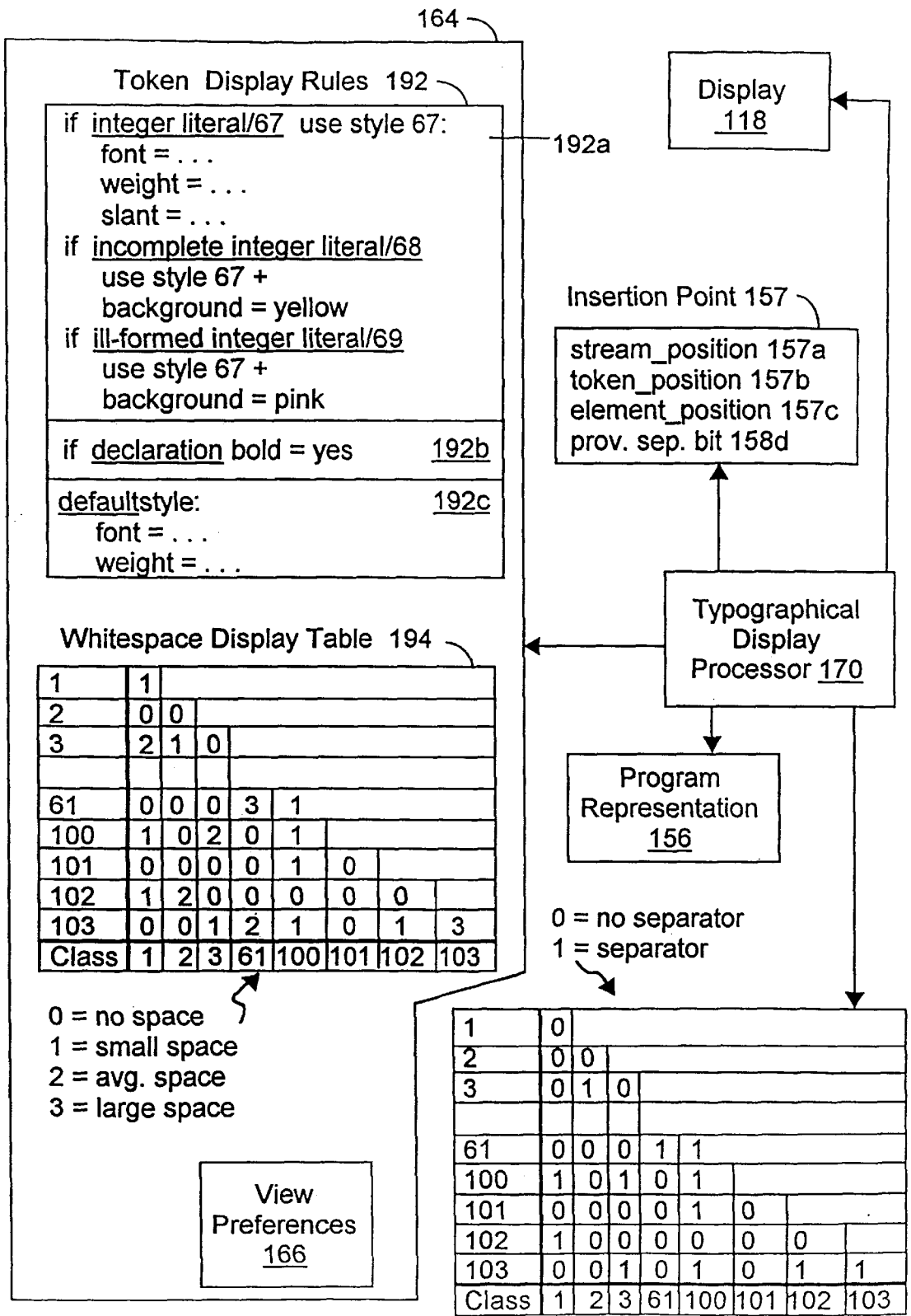
FIG. 5 is a block diagram of the typographical display processor of FIG. 2 and the data structures with which it interacts.

In the first of the examples ("position"=1) in FIG. 5, the user has typed a plus token "+" between two editable elements of the token "ab". Consequently, when this token stream segment 138 is evaluated by the tokenizer 132, it is split into three tokens with implicit token boundaries (implicit because the equivalent text stream "a+b" is unambiguous regardless of intervening spaces). Thus, the tokenizer 132 suggests the updated token stream segment 138', where the insertion point is in position 2, between the "+" and "b" tokens with no separator. The second example ("position"=2) is similar, except in this case, the initial token stream consisted of two tokens "a" and ")" with no separator. Because the updated token stream 138' is equally unambiguous after insertion of the "+" token, no separator is required between the "+" and ")" tokens, meaning the final insertion point and cursor are still in position 2.

The third example ("position"=3) is interesting because it results in the elimination of a separator. In this case the user has placed the insertion point between the first "+" token and the separator ("☐") and entered another plus "+". The tokenizer 132 recognizes the two plus characters "++" as a legitimate C/C++ arithmetic operator, so it joins the two into a single "++" token. The tokenizer 132 also recognizes, based on the contents of the separator table 168a-1, that no separator is necessary between the "++" token and the adjacent arithmetic operator "+". Thus, the tokenizer 132 returns an updated token stream segment 138' in which the separator has been removed and the insertion point is now between the "++" and "+" tokens; this is position 2. In the fourth example ("position"=4), the separator also has disappeared after the insertion. This is because, the ambiguity, thus the need for a separator, between the adjacent variables "a" and "b" is eliminated by the insertion of the plus token "+". Thus, the final insertion position in the updated token stream segment 138' is position 2, following the just-inserted plus token.

In the fifth example (also with "position"=4), the tokenizer 132 inserts the character "a" into the token stream segment "a☐|.1" and reanalyzes the resulting text string. Because, in C/C++, it might be possible to join the inserted identifier "a" with either an identifier (such as "a", to the left of the insertion point) or a floating point literal (such as ".1" to the right of the insertion point), in the updated token stream segment 138', a separator is associated with the token boundary between the tokens "a" and ".1". However, in this particular example the new separator is unnecessary as the particular tokens "a" and ".1" could never legitimately be joined. In the sixth and final example, the provisional separator is present because, before the current insertion event, the user typed a space between the tokens "a" and ")", where no separator was otherwise required. When the user types the character "+" the tokenizer 132 deletes the provisional separator, which is no longer necessary given the unambiguous boundaries between the tokens "a", "+" and ")", and the insertion point lies in position 2, between the "+" and ")" tokens.

b. Deleting a Character

When the user deletes an editable element in the token stream 158, the action taken by the keystroke executive 130 depends on the editing context. When the user deletes the only character of a single character token, the keystroke executive 130 deletes the token from the token stream segment 138. When the user deletes the separator between two tokens, the keystroke executive 130 joins the adjacent tokens of the token stream segment 138 into a single token. When the user deletes a character from a multi-character token, the keystroke executive 130 removes the character from the token. In most cases, after deleting the character the keystroke executive 130 reanalyzes the resulting flow in the same fashion as for insertions, then writes the updated token stream segment 138' back to the token stream 158.

Table 6 shows how the keystroke executive 130 and tokenizer 132 respond to a "delete next character" command issued by the user when the cursor is at a position in the flow corresponding to the various insertion positions. A similar table is not shown for the "delete previous character" command as those results are nearly symmetrical to those shown below.

TABLE 6

Delete Next Character

| Position | Example | Editor Response | Final Position |
|---|---|---|---|
| 1. Within a token. | A|BC | Change "ABC" to "AC"; reanalyze. | 1: "A|C" |
| 1. Within a token. | A|B+ | Change "AB+" to "A+"; reanalyze. | 2: "A|+" |
| 1. Within a. token. | A|B☐C | Change "AB☐C" to "A☐C"; reanalyze. | 3: "A|☐C" |
| 2. Between, no sep. | +|AB | Change "+AB" to "+B"; reanalyze. | 2: "+|B" |
| 2. Between, no sep. | A|+B | Change "A+B" to "AB"; reanalyze. | 3: "A|☐B" |
| 3. At left of a separator. | A|☐B | Change "A☐B" to "AB"; reanalyze. | 1: "A|B" |
| 3. At left of a separator. | A|☐.1 | Change "A☐.1" to "A.1"; reanalyze. | 4: "A☐|.1" |
| 4. At right of a separator | A☐|B+ | Change "A☐B+" to "A☐+"; reanalyze. | 2: "A|+" |
| 4. At right of a separator. | A☐|BC | Change "A☐BC" to "A☐C"; reanalyze. | 4: "A☐|C" |
| 5. At right of a separator. | +■|AB | Change "+■AB" to "+■B"; reanalyze. | 2: "+|B" |
| 5. At right of a separator. | A■|+B | Change "A■+B" to "A■B"; reanalyze. | 4: "A☐|B" |
| 6. At left of a sep., right of a prov. sep. | A■|☐B | Change "A■☐B" to "A■B"; reanalyze. | 4: "A☐|B" |

In example 6 (starting position=3, final position=1), the user is attempting to delete the separator between the adjacent tokens "A" and "B". The keystroke executive 130 treats this as a request by the user to join the tokens adjacent the separator. Thus, in example 6, the result of the deletion operation is the single, two character token "AB", where the final insertion point position lies between the "A" and the "B". However, in some cases, as in example 7, where an unnecessary separator has previously been inserted between two tokens, the user's attempt to delete that separator will result in a no-operation. In this example (starting position=3, final position=4), the user has attempted to delete the separator between the tokens "A" and ".1". As a result of this editing operation, the keystroke executive 130 asks the tokenizer 132 to reanalyze the textual equivalent of the starting token stream as if the space corresponding the separator were not present (i.e., the text stream "A.1"). Because this textual equivalent clearly comprises an adjacent identifier and floating point literal, the tokenizer 132 does not join the three characters "A", ".", and "1" into a single token, but returns two tokens "A" and ".1" to the keystroke executive 130. The keystroke executive 130, seeing that the tokenizer 132 did not comply with the request to join the tokens, leaves the separator in place and merely moves the insertion point over the separator. This is why, in example 7, the updated token stream segment 138' is identical to the starting token stream segment 138, but the insertion point is changed to position 4, to the right of the separator. The remaining examples in Table 6 follow in a straightforward manner from these examples and other descriptions of the various insertion points and token stream updating methods of the present invention.

c. Inserting a Space

In the present editor 122 the user is encouraged to think of the spacebar textually (i.e., as in a traditional text editor where the user enters a space by hitting the space bar); however, in the present editor 122, by typing a space the user actually tells the keystroke executive 130 that there should be a token boundary at the insertion point. The keystroke executive's response to the spacebar depends on where in the token flow the user attempted to enter the space. For example, the keystroke executive 130 will not create a boundary where one already exists. The possible responses of the keystroke executive 130 to the user's attempt to insert a space are illustrated in Table 8 for the six basic insertion point positions.

TABLE 7

Press Space Bar

| Position | Example | Editor Response | Final Position |
|---|---|---|---|
| 1. Within a token. | (n: i\|n☐int) | Split "in" into "i" and "n"; reanalyze. | 4: "i☐\|n int" |
| 2. Between, no sep. | (n: \|in☐int) | Add provisional separator. | 5: "n: ■\|in☐int" |
| 3. At left of a separator. | (n: in\|☐int) | Move insertion point over separator. | 4: "in☐\|int" |
| 4. At right of a separator. | (n: in☐\|int) | No-op (blink insertion point). | 4: "in☐\|int" |
| 5. At right of a prov. sep. | (n: ■\|in☐int) | No-op (blink insertion point). | 5: "n: ■\|in☐int" |
| 6. At left of a sep., right of a prov. sep. | (n: in■\|☐int) | No-op (blink insertion point). | 6: "in■\|☐int" |

As an alternative to the third example (starting position=3) in Table 7, the keystroke executive 130 could place the insertion point in position "6" after the user types a space at position "3". This outcome would reflect a belief that the user is typing the space as the first step in adding a new token between the tokens "in" and "int". The third example in Table 7 reflects a different belief, that the user expects the insertion point to progress past the space just typed. Each of these implementation alternatives are motivated by a desire to provide program editing behavior that users accustomed to text editors would consider normal. Other alternatives consistent with the design of the editor 122 could also be proposed.

d. String Literals

The present editor 122 treats strings as tokens of the lexical class "string literal" which are included in the token stream 158. However, none of the preceding rules regarding token formation and token stream updating are applicable to the editing of string literals. This is because string literals do not have to observe the same lexical rules as program statement, apart from using the appropriate begin string and end string delimiters, such as the double quotes (") required in C and C++. For example, whereas there is a general rule in the editor 122 that no spaces are allowed in the token stream 158, string tokens may contain spaces. Thus, the keystroke executive 130 handles strings exceptionally, by forming a single token of class "string literal" containing all of the keystrokes, including characters and spaces, entered by the user, and storing that token in the token stream 158 as any other token would be stored. The editor 122 also provides a lexical class of "incomplete string literal", to allow the proper treatment and typographical representation of strings as they are being entered or edited.

For example, consider the normal method by which a new string token is created in the editor 122. First, the user types a double quote (") to start the string. The keystroke executive 130 then passes the double quote and a token stream segment 138 to the tokenizer 132, which recognizes the double quote as belonging to the lexical class of "incomplete string literal" and suggests that the keystroke executive insert a new token (") of class "incomplete string literal" into the token stream 158. Assuming that the user continues to type string characters after the opening double quote, the keystroke executive 130 does not call the tokenizer to analyze these subsequent keystrokes, but simply appends them to the same incomplete string literal. In other words, when the user is editing a string, the editor 122 behaves like a normal text editor. When the user ends the string by typing the closing double quote the keystroke executive 130 appends that final character to the string token and changes the lexical class of the token to "string literal." This process can reversed by the user typing backwards starting with the closing double quote.

However, users often depart from this simple method of entering a string literal. For example, a user wishing to turn part of a line of code into a string might first type the entire line, then move the cursor back to a point in the middle of the line and enter the opening double quote, perhaps followed by some additional characters, then move the cursor to the end of the line and type the closing double quote. The following series of statements illustrate such an editing sequence, the cursors position after each step being indicated by the "|" character:

1. a=b+c*d|
2. a="|b+c*d
3. a="|b+c*d
4. a="e/|b+c*d
5. a="e/b+c*d"

At step 1, the keystroke executive 130 and the tokenizer 132 will have generated a token stream 158 including 7 tokens (a, =, b, +, c, *, and d), all separated by implicit token boundaries. At step 2, the keystroke executive 130 inserts a new, incomplete string literal, including only the double quote, between the equals and the "b" tokens. In steps 3 and 4, the keystroke executive appends the two additional characters, "e" and "/" to the incomplete string literal, so that the token string now includes 8 tokens (a, =, "e/, b, +, c, *, and d). So far, the actions of the keystroke executive 130 and tokenizer 132 in response to these first four steps are no different from those described for the normal case; however, in step 5, when the user types the closing double quote, the tokenizer 132, which only analyzes a small portion of the token stream, for example, the final "d", is not aware of the opening quote some 6 tokens. Thus, instead of including all of the tokens from "+" to "d" in the string literal beginning "e/, as intended by the user, the tokenizer 132 suggests that the keystroke executive 130 add another new, incomplete string literal to the token stream 158. However, as the keystroke executive 130 is aware of contextual information not provided to the tokenizer 132, e.g., the fact that the line on which the user is typing includes another incomplete string literal, the keystroke executive 130 will reject the tokenizer's suggestion, and treat the second double quote as the closing double quote of the first incomplete string literal, meaning the updated token stream 158 will include three tokens, (a, =, and "e/b+c*d"). Note that the keystroke executive 130 can perform the same kind of on-the-fly, contextual matching for other bracketing characters such as parentheses, square brackets and curly braces.

In an alternative preferred embodiment of the present editor 122, a second string literal management model is provided that does not permit unmatched string literal delimiters to be entered by users. In this model, whenever the user types an unmatched string delimiter, the keystroke editor 130 causes a complete string literal object to be created, including the closing quote, which is displayed by the typographical display processor 170 in a distinctive manner, such as within a box with visible boundaries. As long as the user keeps the cursor and insertion point within the string literal borders, the keystroke executive 130 simply passes all user keystrokes to the appropriate string literal object. When the user types the ending quote symbol, the keystroke executive 130 moves the insertion point across the closing quote. Once a string literal object has been created, the user is not allowed to delete either of the quotes until all of the characters in the string are deleted. Thus, there are no unmatched string literals in this second string management model. Unlike the first model, discussed above, there is also no way for strings to become program tokens and vice versa as a side-effect of normal editing actions.

This concludes the detailed description of the lexical analysis performed by the keystroke executive 130 and/or the tokenizer 132. We will now proceed to a discussion of the other functional block included within the keystroke executive 130, the comment processor 136.

Comment Processor 136

The comment processor 136 processes program comments entered by a user. Generally, a user has wide latitude as to where the comments are placed and what purpose they serve. For example, a comment might be a line of typographical characters used to separate two blocks of code, a text paragraph explaining the function of the preceding or following block of code, or a brief description of a variable being declared on the same line.

Figure 4:
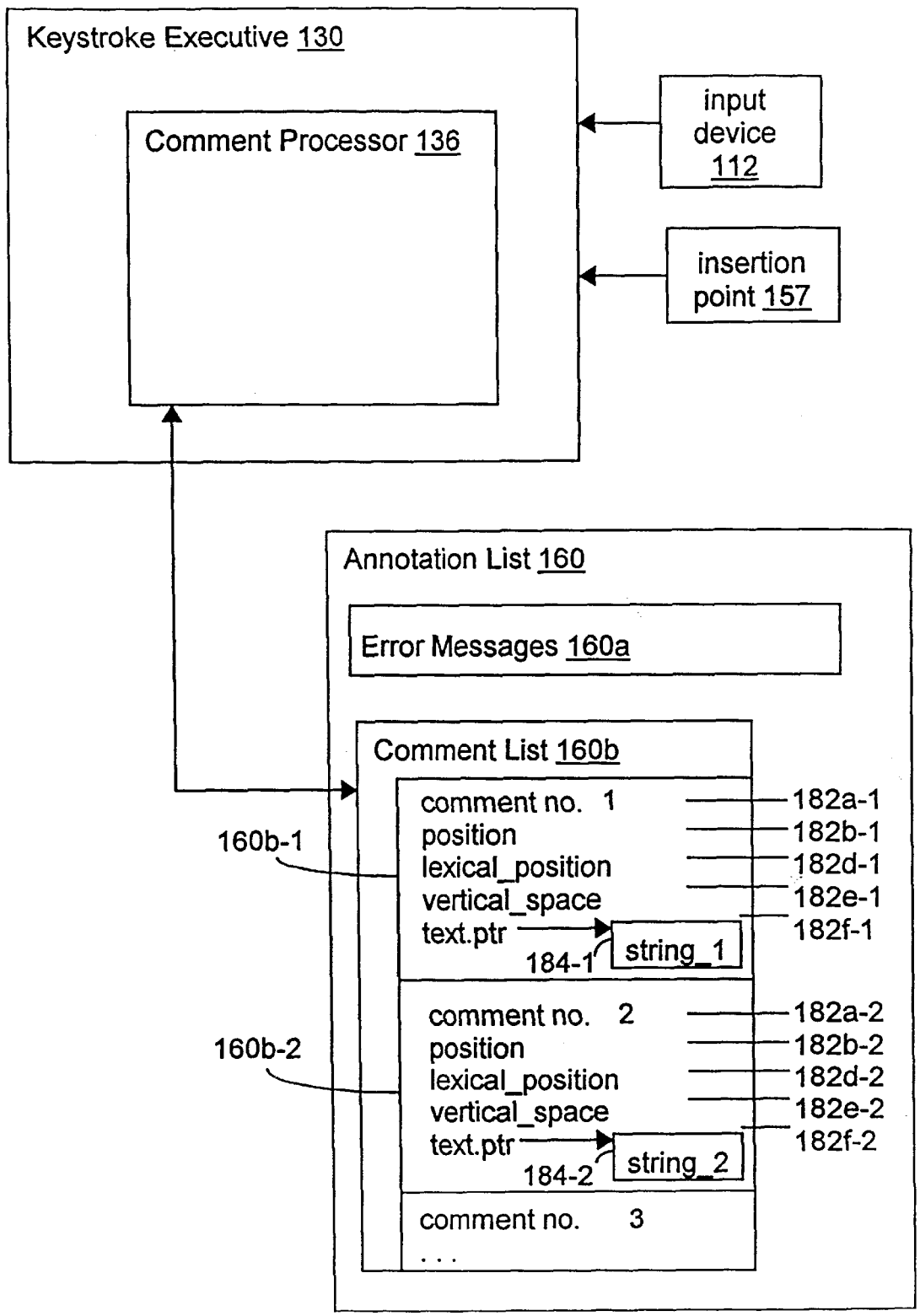
FIG. 4 is a block diagram of the comment processor of FIG. 2 and the data structures with which it interacts.

Referring to FIG. 4, there is shown a block diagram of the editor 122 that emphasizes the functional blocks and data structures related to the comment processor 136. The elements in FIG. 4 not shown in prior figures include comment list elements 160b-1, 160b-2. As described in reference to FIG. 2, the comment processor 136, which is called by the keystroke executive 130, is responsible for managing the comment list 160b. In the preferred embodiment of the present editor 122, this comment list is implemented as a C++ object that inherits certain of its properties from the Annotation List 160b, which is also implemented as a C++ object. The comment list 160b comprises a list of comment elements 160b-i, where i is an integer between O to N. Each of these comment elements is an instance of the C++ class "CLComment", which is a language specific type (i.e., its attributes are specific to a specific language such as C++) that inherits from the language independent class "Annotation", which defines the general attributes of annotations, such as comments. This structure, where the comments are completely separated from the program is an important element of the editor 122. This is because, only by splitting the program representation in this way can the language comments be separated from the program tokens, allowing the keystroke executive 130 and the tokenizer 132 to analyze the program tokens on the fly.

As is shown in FIG. 4, the attributes associated with the class 'ClComment" and with each comment list element 160b-i include a comment identifier 182a, the anchor position 182b of a comment within the token list 158, lexical_ position 182d, vertical_space 182e and a text pointer (text.ptr) 182f, which addresses one or more strings containing the text of the comment as entered by the user. These attributes will be described below.

1. Method of Operation—Comment Processor 136

The keystroke executive 130 initially calls the comment processor 136 whenever the insertion point 157 is between tokens and the user types a comment beginning delimiter, such as "/*", used in C, or "//", used in C++. This process was described above in the context of the discussion of the keystroke executive's lexical analysis process. The comment processor 136 then records every keystroke of the comment until the user types the comment ending delimiter (e.g., "B*/") or the keystroke executive 130 ceases to pass on the keystrokes from the event stream 113, such as when the user moves the cursor outside the comment boundary. While a comment is being entered, the keystroke-by-keystroke lexical analysis described above is disabled. This is because the content of a comment is not subject to lexical rules like regular program statements.

In addition to recording the text of each comment, the comment processor 136 also records a small amount of textual positioning information about each comment. This information is necessary so that the comment can be correctly positioned by the typographical display 170 processor relative to the text (tokens) with which the comment was originally associated. By storing this information outside the program syntax tree 162, two problems associated with comment storage in prior art tree-based structure editors are avoided. First, by associating the comments with the token stream 158, which is not affected by program compilation, it is easy to keep comments correctly positioned in the structured program representation 156, and therefore the program display 118, from one compile to the next. This is not possible in the prior art editors, which attach the comments to specific nodes of the syntax tree 162, which is modified by the compiler/parser. Second, given that the present editor 122 maintains the token stream 158 on the fly, it always possible to associate the comments with the structured representation 156, even when the syntax tree 162 has not been generated or when there is no structural analyzer 150 at all. In contrast, the prior art structural editors cannot associate comments with the syntax tree for parts of the program containing syntax errors preventing the structural representation of those parts. Finally, this representation which stores minimal comment information is far more compact than structural editors which solve the problem of locating comments tied to a syntax tree by storing with those comments copious amounts of information allowing the comments original textual position to be recovered.

First, as was mentioned above, the comment processor 136 records the complete text of each comment. This text is stored in a form of representation that is suitable for textual editing. For example, the preferred embodiment of the present invention stores comment texts as strings 184-i that can be accessed by a text editor. In an alternative embodiment of the editor 122, comments are stored as word processor documents, which can then be edited as embedded documents within the program 124. Second, the comment processor 136 records the exact position of each comment with respect to the lexemes/tokens of the token stream, or flow, 158 in which the comment was entered. In the preferred embodiment of the editor 122, this information is represented as the variable "position" 182b, within a comment list element 160b, where the position 182b is set by the comment processor 136 to the integer position of the token in the token stream 158 immediately to the right of the comment. This encoding implies the following about the representation of comments by the comment processor 136:

1) there may be any number of comments at a single token position;
2) the ordering of comments at a single token position must be recorded externally; e.g., by order of appearance in the comment list 160b;
3) there can be any number of comments at position O (before all language tokens); and
4) there can be any number of comments at position N (after all language tokens).

Third, the comment processor 136 stores information regarding the positioning of the comment with respect to adjacent lines of the program 124 as it was entered by the program author. This type of information is represented in terms that correspond to the ways in which authors typically enter comments; e.g., whether the comment was embedded in a line of text or on a separate line, and how many blank lines the author entered around the comment. The comment processor 122 stores this information in one of two ways: symbolically or in terms of adjacent line breaks. The symbolic storage technique is employed by the preferred embodiment of the present invention and is the technique illustrated in FIG. 4. This symbolic information consists of two enumerated variables, "lexical_position" 182d and "vertical_space" 182e.

The first variable, lexical_position 182d, reflects the comment's position with respect to the nearest language tokens and is selected from the set of values that includes: "Line", "Trailing" and "Embedded", where "Line" indicates that the comment is on a line or lines by itself; "Trailing" means that language tokens appear only to the left of the comment and on the same line, and "Embedded" indicates that language tokens are to the right of the comment and on the same line. The second variable, vertical_space 182e, is related to the existence of vertical space above and/or below the comment and has a value that can be selected from: "noVerticalSpace", "beforeOnly", "afteronly" and "beforeAfter". These values have the following meanings: "noVerticalSpace" means that there are no blank lines above or below the comment; "beforeOnly" and "afteronly" indicate that there are blank lines only preceding/following the comment; and "beforeAfter" indicates that there are blank lines both before and after the comment. These two enumerated variables 182d and 182e capture the placement of comments in an way that will prove most useful to the prettyprinter 170. To generate this information, the comment processor 136 accesses and analyzes the parts of the token stream 158 adjacent to the comment's anchor spot (i.e., stream position 182b).

The second storage technique, used in an alternative embodiment of the present invention, is simpler than the first. The information stored in this second technique is actually computed in the same manner as the information generated in the first storage technique, but is stored without being abstracted. This information consists of two integer variables, "prec_newlines" and "subs_newlines", which represent, respectively, the number of line breaks (newlines) that immediately preceded and followed the comment in the textual representation of the program (i.e., this representation represents where the user placed the comment in the context of the other displayed program lines). Having set out the manner in which the comment processor 136 represents comment positions, we will now describe in greater detail how comment text is represented.

As mentioned above, the comment processor 136 stores the text of a comment separately from the token stream and in a form of representation suitable for text documents. Because the keystroke executive 130 is always aware of when the user is entering a comment or has moved the cursor/insertion point 157 within the boundary of a comment object, the user is freed from delimiting and formatting each line of the comment according to C or C++ comment formats as in a text editor, but rather, can enter the comment as a free form text block to be formatted and placed by the typographical display processor 170. The TDP 170 can control several aspects of the display of comments. Most importantly, the TDP 170 displays comments in a visually distinct manner from the way in which it displays program statements; for example, by placing a box around the comment and/or using a different background color from the program statements. The TDP 170 can also format and place the comments 160b according to language specific display rules, user view preferences 166, or display options associated with each comment object. For example, a user might wish to display comments (1) inline: surrounded by blank lines where appropriate or as part of a line of code (both based on the particular comment's lexical_position 182d and vertical_space 182e), or (2) out-of-line: as footnotes or marginalia (placed in the right or left margin).

The keystroke executive 130 associates each comment 160b with an anchor position, which is an editable element within the token stream 158; i.e., deleting the anchor position deletes its associated comment 160b. When the comment is displayed out-of-line, the TDP 170 displays an anchor, which is a visible manifestation of the anchor position to give the user a way of manipulating the associated comment which is not displayed coincidentally with its anchor position. When the comment is displayed inline, no anchor is necessary because the comment is located at its anchor position.

This concludes the discussion of the keystroke executive 130; we will now proceed to describe first the structural analyzer 150 and then the typographical display processor 170.

Structural Analyzer 150

The structural analyzer 150 maintains a structured representation, or syntax tree, 162 of the program 124 being entered, the purpose of which is to provide the typographical display facility 170 with additional syntax information that might help it to typeset, or prettyprint, the program 124. As is shown in FIG. 2, the structural analyzer 150 has read access to the syntax rules 168b and the token stream 158, and read/write access to the syntax tree 162.

The structural analyzer 150 performs the same role as any other parser, which is to form a structured representation of a program being compiled or structurally edited that reflects the syntax of the language in which the program is written. In the present invention, the parsed program is structurally represented by the structural analyzer 150 as a syntax tree 162, which, at its higher levels, summarizes the program's functional hierarchy and, at the leaf level, represents the syntax of individual program statements. This is a representation commonly employed by parsers. The form of the syntax tree 162 depends on the syntax rules 168b, which are language specific.

The structural analyzer 150 generates the syntax tree 162 by parsing the token stream according to the syntax rules 168b. If the structural analyzer 150 encounters syntax errors, it generates error messages, which it stores in the error messages list section 160a of the annotation list 160.

Similarly to the comment list 160b, the error messages list 160a is a C++ object that inherits from the Annotation List 160. The individual error messages in the error message list 160a are instances of the C++ class "ClErrMsg" and include the same types of indexing information tying each respective error message to the appropriate node of the syntax tree 162 or, alternatively, an anchor position within the token stream 158. This information allows the typographical display processor 170 to display a unified, typeset view of the program quantum comprising the token stream 158 and its associated annotations 160 (including comments 160b and error messages 160a).

The previous description does not reveal the unique aspect of the structural analyzer 150, which is not so much its function, but the fact that it is executed only upon the user's request. This is because the information provided by the structural analyzer 150 is not needed in order for the typographical display processor 170 to prettyprint the program 124, which can be done based primarily on information in the token stream 158. In contrast, in other structure editors, the syntax tree is the sole basis of information for the program display. Consequently, these other structure editors must run their parsers on a regular basis.

In the preferred embodiment of the present invention, the user invokes the structural analyzer by explicitly requesting an "update". In addition, the user's request for an update can be implied, such as when the user types a carriage return or a semicolon, which, in C, ends a program statement. Thus, the user can obtain updates whenever it is necessary or most convenient (syntactical analysis being a computer resource-intensive process).

Typographical Display Processor 170

Referring to FIG. 5, there is shown a block diagram relating the typographical display processor 170 to the various data structures from which it receives the information it displays. These data structures include the insertion point 157, program representation 156, the separator table 168a-1 and view preferences 166. These data structures also include token display rules 192 and a whitespace display table 194, which are additional elements of the editing database 164 not shown in FIGS. 1 or 2.

The typographical display processor (hereinafter referred to as the "TDP") 170 uses information from these data structures, to which it has read access, to prettyprint the program being edited 124 to the display 118, where prettyprinting the program involves the TDP 170 displaying the program being edited 124 in an aesthetically pleasing and ergonomically valuable way. When performing this job, the TDP 170 performs many tasks that are performed in WYSIWYG ("what you see is what you get") word processors. However, the fact that the TDP 170 is performing these tasks on a computer program quantum internally represented as a token stream 158 and a related set of annotations 160a, 160b means that the TDP 170 performs additional tasks not required of either prior art program editors or WYSIWYG program editors. These additional tasks include: (1) displaying in a visually informative manner the token stream 158 and annotations 160 comprising the program quantum being displayed, and (2) controlling the visual whitespace between the displayed tokens and the behavior and appearance of the cursor with which the user edits the program 124 when the cursor is in proximity to displayed inter-token visual whitespace, both of which are discussed below.

1. Display of Tokens and Annotations:

Like the keystroke executive 130, the TDP 170 executes after each user keystroke. The TDP 170 also executes after every syntactical update performed by the structural analyzer 150. Thus, the TDP is able to update the prettyprinted display 118 of the program whenever the program's representation changes in any meaningful way.

After a user keystroke, the TDP 170 consults the program representation 156 to determine whether the keystroke executive 130 updated the insertion point 157 and/or the token stream 158, after which the TDP appropriately updates the display of the insertion point 157 and/or the changed tokens (i.e., the updated token stream segment). Following a syntactical update by the structural analyzer 150, the TDP 170 updates the display of whatever parts of the program were newly analyzed, combining any syntactical information newly available from the syntax tree 162 with the existing lexical information contained within the token stream 158. In the absence of subsequent requests for syntactical analysis, the TDP 170 continues to display the information in the syntax tree 162, merging the older syntactical information with the new token stream 158 data. Moreover, in the complete absence of any syntax tree, as when the program 124 is being newly entered, the TDP 170 is able to generate the prettyprinted display 118 based solely on the token stream 158. In this way, the TDP 170 always displays the best structural/lexical information available from the program representation 156.

In addition to displaying the token stream 158, possibly supplemented by syntactical information from the syntax tree 162, the TDP 170 can display error messages 160a generated by the structural analyzer 150 and comments 160b from the comment processor 136 at the appropriate places within the displayed token stream 158. For example, if the comment table indicates that a certain comment 160b-K (e.g., "/* i is an index */") has a lexical position of "Trailing" and a stream position 182b of N, and token N was the semicolon ";" used in the expression i=0; the TDP 170 would prettyprint that part of the token stream 158 and the comment as:

i=0; /* this is an index */

While the present discussion is directed to the printing of comments and syntax error messages, other types of annotations might be included in the annotation list 160, for example, semantic error messages from the semantic analyzer 175. The TDP 170 can also prettyprint any of these other types of annotations. In addition, while the TDP 170 controls the format of the displayed information, the user determines the extent of information displayed by the TDP 170 via the user view preferences 166, which is a table in which the user defines which classes of annotations, and types of syntax and lexical information the TDP 170 should display.

To render a pleasing, highly legible and helpful program display, the typographical display facility 170 displays each token with its own typographical attributes, over which the user has no direct control. The TDP 170 computes these attributes based on several sources of information. The primary source is the linguistic, or lexical, class of the token (e.g., integer literal, semicolon, variable) and the class's associated "style", defined for each class of token in the lexeme display rules 192a, where a style is a named set of visual display attributes that includes typeface, size, slant, weight, color and background. For example, in FIG. 5, the lexeme display rules 192a set out a display style "67" associated with integer literals, or class "67" tokens. FIG. 5 also shows that the styles for incomplete and ill-formed integers are derived from the integer literal's style with visually distinctive background changes; the display of these kinds of tokens is described later in this section.

A second source of display information is the linguistic context of the token, also expressed via named styles defined in the context display rules 192b. For example, consider the following snapshot of a program screen displayed by the TDP 170:

```
for (i: int = 0; 1 < 6; i + +) {
    outi = a[i];
    eol = 1;
}
```

In this snapshot, the first occurrence (i.e. declaration) of the token "i" has a contextual style "declaration" that, according to FIG. 5, adds the attribute "bold" to the style for the identifier. The second occurrence of token "i" has no such additional context; therefore it displayed without the attribute "bold". A third source derives from dynamic effects caused by non-local contextual information computed by the editor 122 during typing. For example, the nesting of parentheses (and other bracketing tokens, e.g., braces and square brackets) are computed by the keystroke executive 130 during typing. A special style can be applied to unmatched parentheses and other similar bracketing characters. Finally, each token has a default style 192c, from which typographic attributes are taken when no other source specifies a value. All these various sources are included within the token display rules 192 in FIG. 5.

As set out above, the present editor 122 computes the local, or lexical, properties of tokens as the user types, only computing the larger linguistic, or syntactical, context when the user requests an update from the structural analyzer 150. Thus, the TDP 170 has less information available for new tokens, those entered or modified since the most recent update, than it does for the rest. The TDP 170 signals this fact to the user by employing a different "new" style for new tokens, in place of the syntactic context otherwise computed during an update. For example, the four tokens "eol=1;" in the snapshot above are displayed in the "new" style. In preferred embodiments of the present invention, visual effects for the "new" style are unobtrusive and metaphorically suggest the diminished information available, for example, the new token is indicated via a paler background shade relative to the rest of the quantum. Visual effects for token styles are also selected to approximate the desired final effect as closely as possible. This is so a subsequent update by the structural analyzer 150 causes as few visual changes as possible, and those visual changes should be perceived by users as adjustments to the token based typography used for new tokens. That is, when the new token is analyzed by the structural analyzer 150, only its background might change.

As described above, the keystroke executive 130, sometimes with the assistance of the tokenizer 132, characterizes each token according to a set of extended lexical classes from the extended lexeme table 168a-2. Some of the lexical types such as "incomplete floating point literal" or "incomplete string literal" correspond to tokens which are prefixes of valid tokens but are not themselves legal, which may arise during typing. The TDP 170 represents these incomplete tokens unobtrusively, as a slight change in background color or background effect. In all other respects (i.e., size, weight, slant) the TDP 170 displays the incomplete tokens identically to the legal tokens of the same general class in order not to distract the user during typing.

The editor 122 also characterizes some tokens as ill-formed, or illegal. For example, "Bad Numeric Literal" or "Bad Identifier". These illegal tokens are generally not prefixes of legal tokens and represent language errors. The TDP 170 displays these illegal tokens in a way that is noticeable to the user of the editor but not annoying. For example, in the preferred embodiment of the present invention, ill-formed tokens are displayed with the same size, weight and slant as legal tokens of the same general class but with a different background color that is, of course, different from the background color associated with an incomplete token. Thus, the user is made aware, as they type, of the change from an incomplete token to a legal token to an illegal token.

For example, consider Table 8, which shows a event stream 113 being entered and its corresponding token stream representation 158 formed on the fly by the keystroke executive 130.

As the user types the series of characters from the event stream 113, the TDP 170 would first display the resulting token with the attributes associated with a new integer literal ("0"), then an incomplete integer literal "0×", then as an integer literal "0×5" and finally as an illegal integer literal "0×5H".

In addition to detecting lexical errors, the editor 122 can also detect and manage syntactical and static semantic errors (generated by the semantic analyzer). The TDP 170 could display all of these categories in distinctive ways but, in the preferred embodiment, chooses to visually downplay these different classes of errors to avoid overwhelming the user with a torrent of different visual styles. Alternatively, the TDP 170 could employ a tone or other more prominent signal to indicate that the user has entered an ill-formed token.

2. Visual Whitespace Display and Cursor Behavior

As important as the way in which the typographical display processor 170 displays the tokens is the manner in which it displays the visual whitespace between the tokens and positions and displays the cursor within the displayed token stream 158.

As with tokens, the TDP's display of the visual whitespace between tokens is determined by a set of language-specific, display rules embodied in a whitespace display table 194 and the editing context, which comprises the lexical types and syntactical context of adjacent tokens to be separated by visual whitespace. As in a WYSIWYG natural language display processor, the whitespace display table 194 allows the TDP 170 to vary the amount of visual whitespace between adjacent tokens in order to achieve a pleasing and ergonomically valuable display of the program 124. In the preferred embodiment, the whitespace display table 194 defines the visual whitespace to be displayed between adjacent tokens as one of four enumerated values: "0" (none); "1" (small); "2" (average) and "3" (wide). For example, according to the whitespace display table in FIG. 5, the TDP 170 is to insert "wide" whitespace between two adjacent tokens of lexeme type "61", which is associated with "variables". This means that the TDP 170 may separate adjacent displayed tokens by no visual space at all, by a relatively large amount (as wide as one or more characters), or anything in between (i.e., visual whitespace may vary continuously with the resolution of the display device). This behavior contrasts greatly with conventional text-based program editors, where the spaces have a constant width; consequently, the TDP 170 must ensure that the different amounts of visual whitespace do not confuse users used to the behavior of conventional text editors. The primary way the TDP does this is by controlling the position and display of the cursor, based on the insertion point before and after the editing operation and the amount of displayed visual whitespace. After the TDP 170 determines the correct amount of visual whitespace to display between adjacent tokens, it converts that abstract value to a physical distance related to the resolution and size of the display 118. Of course, the TDP 170 can use any number of visual whitespace levels in the whitespace display table 194.

As was set out above, the insertion point can appear in six different contexts, which are indexed and described in Table 3. Since each of these insertion positions may produce different editing behavior (refer to preceding Tables 4–8), the TDP modifies the basic cursor I-beam shape to differentiate the various insertion points. In the preferred embodiment, the TDP 170 varies the top and bottom (horizontal) parts of the I-beam to reflect size of the visual whitespace gap in which it is positioned. Thus, when the insertion point is in positions 1, 3 or 4, the I-beam cursor displayed by the TDP 170 will be narrow and conventional. This is because, in these situations, the cursor is between editable elements comprising, respectively, two characters (position 1); a character and a separator to the right of the character (position 3); or a separator and a character to the right of the separator (position 4). When the insertion point is in position 2, when the cursor is between two tokens separated only by an implicit token boundary, the TDP 170 extends the horizontal portions of the I-beam cursor in order to fill the visual whitespace gap, with the vertical bar of the cursor centered between the two tokens. The variation in the width of the horizontal bars is subtle in most circumstances, but when a layout gap is wide, this TDP 170 display approach accurately illustrates the situation: i.e., the cursor is positioned exactly between the tokens, and touching (both forward and backward) the characters that would be affected by a subsequent delete forward or delete backward command. When the insertion point is in positions 5 or 6, where it is to the right of a provisional separator, the TDP 170 displays the I-beam cursor in the same manner as described in reference to insertion positions 1, 3 and 4, but may darken or brighten the cursor so that the presence of a provisional separator is apparent to the user. From these insertion positions, as well as position 4, the editor 122 will not respond when the user strikes the spacebar. To signal this no-operation or no-op state, the TDP 170 blinks the cursor. Thus, the TDP displays the cursor in a way that clearly shows the user the current editing context, allowing the user to edit editable separators when available and pass over visual whitespace where there is no editable separator. In the more typical editing contexts, such as when the cursor is in positions 1, 3 and 4, the TDP moves the cursor among editable elements exactly as in a text editor, enhancing ease of use.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Keystroke Executive 130 Method—Pseudocode

```
if a keystroke is detected {
    determine the insertion_point;
    if the keystroke is part of a comment
        do not update the token stream;
        call the comment processor 136, which updates the
            comment list 160a,a data structure completely
            separate from the token stream 158, based on
            keystroke and insertion_point;
    else {
        read a token stream segment 138 from the token stream 158
            consisting of a predetermined range of tokens to the
            left and right of the insertion point 157;
        determine whether the tokenizer 132 must be called to
            suggest an update to the token stream segment in light
            of the current editing context;
        if yes {
            call the tokenizer 132 to suggest an updated token
                stream segment 138' based on
                token_stream_update_logic that considers the
                token stream segment 138, keystroke 113 and
                insertion point information;
            determine, based on the broader editing context,
                whether to update the token stream 158 with
                the updated token stream segment 138'
                suggested by tokenizer 132;
            If yes {
                replace token stream segment in the token
                    stream 158 with the updated token
                    stream segment 138';
                update insertion point;
            } else {
                other special case handling;
            } /* endif */
        } else {
            update token stream segment 138 based on
                token_stream_update_logic that considers the
                token stream segment 138, keystroke 113 and
                insertion point 157;
            update token stream 158 with updated token stream
                segment 138';
            update insertion point;
        } /* endif */
    } /* endif - non-comment processing loop */
} /* end pseudocode description of keystroke executive */
```

Token stream update logic—pseudocode

```
token_stream_update_logic (insertion_point
157, token_stream segment
158, character 113, editing_operation) {
    if editing_operation is "insert character" {
        if character is a token {
            add the token to the token_stream_segment;
            lexically analyze the updated token_stream_segment;
            set insertion_point.token_position to one of 2 or 3
            based on preceding lexical analysis.
        } else {
            if insertion_point.token_position is 1, 2, 4 or 5 {
```

37
-continued

```
            add the new character to the
            token_stream_segment to the right of
            insertion_point;
            lexically analyze and update
            token_stream_segment;
            set insertion_point.token_position to one of 1, 2
            or 3 based on preceding lexical analysis;
        } else if insertion_point.token_position is 3 {
            add the new character to the
            token_stream_segment to the right of
            insertion_point;
            lexically analyze and update
            token_stream_segment;
            set insertion_point.token_position to one of 2 or
            3 based on preceding lexical analysis;
        } else if insertion_point.token_position is 6 {
            analyze new character as new token;
            add new token to the token stream segment;
            set insertion_point.token_position to one of 2 or
            3 based on preceding lexical analysis.
        } /* endif */
    } /* ending "insert character" responses */
    } else if editing_operation is "insert space" {
        if the insertion_point.stream_position is 1 {
            split the token into two tokens;
            lexically analyze the updated token stream segment;
            set insertion_point.token_position to 4;
        } else if the insertion_point.stream position is 2 {
            add a provisional separator to the token stream
segment;
            set insertion_point.token_position to 4;
        } else if the insertion_point.stream position is 2 {
            add a provisional separator to the token stream
segment;
            set insertion point.stream_position to 5;
        } else if the insertion_point.stream_position is 3 {
            move insertion point over separator;
            set insertion_point.stream_position to 4 or 6 (when a
            provisional separator was to right of separator);
        } else if the insertion_point.stream_position is 4, 5 or 6 {
            nop;
            do not change insertion_point.stream_position;
        } /* endif "insert space" responses */
    } else if editing_operation is "delete next character" {
        if insertion_point.token_position is 1 or 2 {
            delete the character to right of insertion point;
            lexically analyze effect of delete and update
            token_stream_segment;
            set insertion_point.token_position to one of 1 , 2
            or 3 based on preceding lexical analysis;
        } else if insertion_point.token_position is 3 {
            delete the separator to the right of insertion
            point;
            lexically analyze effect of delete and update
            token_stream_segment;
            set insertion_point.token_position to one of 1 (if
            update resulted in creation of a single token) or
            4 (if update resulted in separator not being
            deleted);
        } else if insertion_point.token_position is 5 {
            turn off provisional separator;
            delete character to right of insertion_point;
            lexically analyze effect of delete and update
            token_stream_segment;
            set insertion_point.token_position to one of 2 (if
            token to right of insertion point not ambiguous)
            or 3 (if deletion caused token to right of
            insertion point to become ambiguous after
            delete);
        } else if insertion_point.token_position is 6 {
            turn off provisional separator;
            move insertion point over separator;
            set insertion_point.token_position to 4;
        } /* endif "delete next character" responses */
    } /* endif */
    } /* endif */
} /* end token_stream_update_logic */
```

38

What is claimed is:

1. A computer readable medium for use in a computer having a memory and at least one input device, said computer readable medium having programs stored thereon to direct said computer to function in a specified manner when said computer and said at least one input device are used to edit a computer program internally represented as a stream of tokens, said programs comprising:

a keystroke executive configured to receive an event stream that includes keystrokes from said at least one input device, said keystrokes corresponding to editing actions made to said computer program using said at least one input device, and to separate program comment keystrokes from program statement keystrokes, said program comment and program statement keystrokes being related to program comments and program statements, respectively, said keystroke executive forming said stream of tokens by lexically analyzing only said program statement keystrokes; and a comment processor configured to receive said program comment keystrokes as said program is being edited, said comment processor grouping said comment keystrokes into said program comments, storing said comments as annotations in a list of annotations and associating with each of said annotations positional information indicating where said comments are located in said token stream for display and printing purposes.

2. The computer readable medium of claim 1, wherein said keystroke executive separates said comment keystrokes from said statement keystrokes by detecting comment delimiters in said event stream.

3. The computer readable medium of claim 1 wherein said positional information comprises:

stream position, which indicates a position of each comment in said stream of tokens; and surrounding newlines, which indicates a two-dimensional position of each of said comments as entered with respect to proximal lines of said tokens.

4. The computer readable medium of claim 3, wherein said surrounding newlines comprises:

lexical position of said comment, said lexical position indicating position of said comment as entered with respect to surrounding tokens in said token stream; and vertical space around said comment, said vertical space indicating newlines entered before and after said comment.

5. The computer readable medium of claim 4, wherein said lexical position is an enumerated variable having one of three predefined values:

"line", to which value said comment processor sets said lexical position variable when said comment is on a line or lines by itself as entered;

"trailing", to which value said comment processor sets said lexical position variable when said comment is on a line with at least one of said program statements and is positioned to the right of all said at least one of said program statements as entered; and "embedded", to which value said comment processor sets said lexical position variable when said comment is on a line with some of said program statements and not all of said some program statements are positioned to the left of said comment as entered.

6. The computer readable medium of claim 5, wherein said vertical space is an enumerated variable having one of four predefined values:

"noVerticalSpace", to which value said comment processor sets said vertical space variable when said comment has adjacent lines of text immediately above and below said comment as entered;

"beforeOnly", to which value said comment processor sets said vertical space variable when said comment has immediately adjacent blank lines only above said comment as entered;

"afterOnly", to which value said comment processor sets said vertical space variable when said comment has immediately adjacent blank lines only below said comment as entered; and "beforeAftere", to which value said comment processor sets said vertical space variable when said comment has immediately adjacent blank lines above and below said comment as entered.

7. The computer readable medium of claim 3, wherein said surrounding newlines comprises two variables:

preceding newline characters, said preceding newline characters being a number of line breaks entered immediately above said comment; and subsequent newline characters, said subsequent newline characters being a number of line breaks entered immediately after said comment.

8. The computer readable medium of claim 1, further comprising a typographical display processor configured to display each of said comments according to language-specific display rules and at display positions with respect to displayed tokens corresponding to said positional information associated with each of said comments.

9. The computer readable medium of claim 8, wherein said typographical display processor displays said comments in a visually distinct manner from said display of said program statements.

10. The computer readable medium of claim 9, wherein any of said comments can be edited as if with a text editor by virtue of a user placing said cursor inside visually distinct borders of said displayed comment.

11. A computer program editing process in which a computer program being edited is internally represented as a stream of tokens, said computer program editing process comprising the steps of:

receiving an event stream that includes keystrokes from at least one input device while a user edits said computer program using said at least one input device;

separating program comment keystrokes from program statement keystrokes, said program comment and program statement keystrokes being associated with program comments and program statements, respectively;

forming said stream of tokens by lexically analyzing only said program statement keystrokes;

representing separately from said token stream said keystrokes associated with said program comments as said program is being edited;

said representing including grouping said comment keystrokes into said program comments and storing said comments as annotations in a list of annotations;

said representing also including associating with each of said annotations positional information indicating where said comments are located in said token stream for display and printing purposes.

12. The editing process of claim 11, wherein said separating step comprises detecting comment delimiters in said event stream.

13. The editing process of claim 11 wherein said positional information comprises:

stream position, which indicates the position of each comment in said stream of tokens; and surrounding newlines, which indicates the two-dimensional position of each of said comments as entered with respect to proximal lines of said tokens.

14. The editing process of claim 13, wherein said surrounding newlines comprises:

lexical position of said comment, said lexical position indicating a position of said comment as entered with respect to surrounding tokens in said token stream; and vertical space around said comment, said vertical space indicating newlines entered before and after said comment.

15. The editing process of claim 14, wherein said lexical position is an enumerated variable having one of three predefined values:

"line", indicating said comment is on a line or lines by itself as entered;

"trailing", indicating said comment is on a line with some of said program statements and is to the right of all said collinear program statements as entered; and "embedded", indicating said comment is on a line with some of said program statements and not all of said some program statements are to the left of said comment as entered.

16. The editing process of claim 15, wherein said vertical space is an enumerated variable having one of four predefined values:

"noVerticalSpace", indicating said comment has adjacent lines of text immediately above and below said comment as entered;

"beforeOnly", to which value said comment processor sets said vertical space variable when said comment has immediately adjacent blank lines only above said comment as entered;

"afterOnly", indicating said comment has immediately adjacent blank lines only below said comment as entered; and "beforeAfter", to which value said comment processor sets said vertical space variable when said comment has immediately adjacent blank lines above and below said comment as entered.

17. The editing process of claim 13, wherein said surrounding newlines comprises two variables:

preceding newline characters, said preceding newline characters being a number of line breaks entered immediately above said comment; and subsequent newline characters, said subsequent newline characters being a number of line breaks entered immediately after said comment.

18. The editing process of claim 11, further comprising the step of displaying each of said comments according to language-specific display rules and at display positions with respect to displayed tokens corresponding to said positioning information associated with each of said comments.

19. The editing process of claim 18, wherein said displaying step further comprises displaying said comments in a visually distinct manner from said display of said program statements.

20. A computer system, comprising:

a processor;

at least one input device configured to receive a computer program;

a display on which said program is displayed as said program is being edited, said display and said at least one input device being coupled to said processor and controlled by applications running in said processor;

a primary memory coupled to said processor for storing said applications and data for said applications;

a secondary memory coupled to said processor for storing said applications and said data for said applications, said secondary memory being slower than said primary memory; and a computer program editor in which a computer program being edited is internally represented as a stream of tokens, said computer program editor being one of said applications running in said processor, said computer program being edited being one of said data, said program editor including:

a keystroke executive configured to receive an event stream that includes keystrokes from at least one input device, said keystrokes corresponding to editing actions made to said computer program using said at least one input device, and to separate program comment keystrokes from program statement keystrokes, said program comment and program statement keystrokes being related to program comments and program statements, respectively, said keystroke executive forming said stream of tokens by lexically analyzing only said program statement keystrokes; and a comment processor configured to receive said program comment keystrokes, said comment processor grouping said comment keystrokes into said program comments as said program is being edited, storing said comments as annotations in a list of annotations and associating with each of said annotations positional information indicating where said comments are located in said token stream for display and printing purposes.

21. The computer system of claim 20, wherein said keystroke executive separates said comment keystrokes from said statement keystrokes by detecting comment delimiters in said event stream.

22. The computer system of claim 20, wherein said positional information comprises:

stream position, which indicates a position of each comment in said stream of tokens; and surrounding newlines, which indicates a two-dimensional position of each of said comments as entered with respect to proximal lines of said tokens.

23. The computer system of claim 22, wherein said surrounding newlines comprises:

lexical position of said comment, said lexical position indicating position of said comment as entered with respect to surrounding tokens in said token stream; and vertical space around said comment, said vertical space indicating newlines entered before and after said comment.

24. The computer system of claim 23, wherein said lexical position is an enumerated variable having one of three predefined values:

"line", to which value said comment processor sets said lexical position variable when said comment is on a line or lines by itself as entered;

"trailing", to which value said comment processor sets said lexical position variable when said comment is on a line with at least one of said program statements and is positioned to the right of all said at least one of said program statements as entered; and "embedded", to which value said comment processor sets said lexical position variable when said comment is on a line with some of said program statements and not all of said some program statements are positioned to the left of said comment as entered.

25. The computer system of claim 24, wherein said vertical space is an enumerated variable having one of four predefined values:

"noVerticalSpace", to which value said comment processor sets said vertical space variable when said comment has adjacent lines of text immediately above and below said comment as entered;

"beforeOnly", to which value said comment processor sets said vertical space variable when said comment has immediately adjacent blank lines only above said comment as entered;

"afterOnly", to which value said comment processor sets said vertical space variable when said comment has immediately adjacent blank lines only below said comment as entered; and "beforeAfter", to which value said comment processor sets said vertical space variable when said comment has immediately adjacent blank lines above and below said comment as entered.

26. The computer system of claim 22, wherein said surrounding newlines comprises two variables:

preceding newline characters, said preceding newline characters being a number of line breaks entered immediately above said comment; and subsequent newline characters, said subsequent newline characters being a number of line breaks entered immediately after said comment.

27. The computer system of claim 20, further comprising a typographical display processor configured to display each of said comments according to language-specific display rules and at display positions with respect to displayed tokens corresponding to said positional information associated with each of said comments.

28. The computer system of claim 27, wherein said typographical display processor displays said comments in a visually distinct manner from said display of said program statements.

29. The computer system of claim 28, wherein any of said comments can be edited as if with a text editor by virtue of a user placing said cursor inside visually distinct borders of said displayed comment.

* * * * *

UNITED STATES PATENT AND TRADEMARK OFFICE
CERTIFICATE OF CORRECTION

PATENT NO.   : 5,813,019
DATED        : September 22, 1998
INVENTOR(S)  : Van de Vanter It is certified that error appears in the above-identified patent and that said Letters Patent is hereby corrected as shown below:

In Column 39, line 13, Claim 6, please replace "beforeAftere" with --beforeAfter--.

Signed and Sealed this

Ninth Day of March, 1999

Attest:

Q. TODD DICKINSON

Attesting Officer        Acting Commissioner of Patents and Trademarks